US007871681B2

(12) United States Patent
Scholte et al.

(10) Patent No.: US 7,871,681 B2
(45) Date of Patent: Jan. 18, 2011

(54) COATING COMPOSITION FOR OFFSET PAPER

(75) Inventors: Bert Scholte, GJ Sittard (NL); Jean-Pierre Haenen, PP Eysden (NL)

(73) Assignee: SAPPI Netherlands Services B.V., Maastricht (NL)

( * ) Notice: Subject to any disclaimer, the term of this patent is extended or adjusted under 35 U.S.C. 154(b) by 626 days.

(21) Appl. No.: 11/667,862

(22) PCT Filed: Nov. 15, 2005

(86) PCT No.: PCT/EP2005/012249

§ 371 (c)(1), (2), (4) Date: May 16, 2007

(87) PCT Pub. No.: WO2006/053719

PCT Pub. Date: May 26, 2006

(65) Prior Publication Data

US 2009/0123768 A1 May 14, 2009

(30) Foreign Application Priority Data

Nov. 16, 2004 (EP) ................................. 04405707
Jul. 13, 2005 (EP) ................................. 05106427
Jul. 13, 2005 (EP) ................................. 05106431

(51) Int. Cl.
*B41M 1/26* (2006.01)
*B32B 15/08* (2006.01)
*C09F 7/06* (2006.01)

(52) U.S. Cl. ..................... 428/32.3; 428/32.5; 428/464; 428/549; 106/310

(58) Field of Classification Search ................. 106/310; 428/32.3, 32.5, 549, 464; 524/413, 457
See application file for complete search history.

(56) References Cited

U.S. PATENT DOCUMENTS 3,901,837 A * 8/1975 Gottesman et al. .......... 106/263
4,311,625 A * 1/1982 Bellettiere et al. .......... 106/264
6,352,768 B1 3/2002 Hseih et al.
6,482,503 B1 11/2002 Malhotra
6,703,112 B1 * 3/2004 Farooq et al. ............ 428/195.1
7,223,453 B2 * 5/2007 Takashima et al. ......... 428/32.3

(Continued)

FOREIGN PATENT DOCUMENTS

EP 0412628 A2 * 3/1990

(Continued)

OTHER PUBLICATIONS

Kenneth W. Sing et al., "Handbook of Porous Solids", Wiley-VCH, p. 1551-1557, vol. 3.

(Continued)

*Primary Examiner*—Mark Eashoo
*Assistant Examiner*—Michael A Salvitti
(74) *Attorney, Agent, or Firm*—Sughrue Mion, PLLC

(57) ABSTRACT

Coating for an offset paper comprising a catalyst for fixing polymerisable or crosslinkable constituents of the offset ink. The chemical drying time can be substantially reduced if such a catalyst system is added to the coating, wherein preferentially such a catalyst is a transition metal complex/salt, like Mn (2-ethylhexanoate, bpy).

31 Claims, 10 Drawing Sheets

U.S. PATENT DOCUMENTS

| | | | | |
|---|---|---|---|---|
| 2003/0195277 | A1* | 10/2003 | Risen et al. | 524/21 |
| 2004/0038818 | A1 | 2/2004 | Risen et al. | |
| 2004/0061763 | A1 | 4/2004 | Wexler et al. | |
| 2004/0061764 | A1 | 4/2004 | O'Connor | |
| 2004/0130608 | A1 | 7/2004 | Campbell et al. | |
| 2005/0033053 | A1* | 2/2005 | Lee et al. | 546/2 |
| 2008/0261021 | A1* | 10/2008 | Haenen et al. | 428/319.1 |

FOREIGN PATENT DOCUMENTS

| | | | |
|---|---|---|---|
| EP | 1 522 416 | A1 | 4/2005 |
| JP | 60-161461 | A | 8/1985 |
| WO | WO 03/016045 | A1 | 2/2003 |
| WO | WO 2004/030917 | A1 | 4/2004 |

OTHER PUBLICATIONS

"Überganismetall-Komplexe", Römpp Chemie Lexikon, Georg Thieme Verlag, 1995.

"Übergangsmetall", Römpp Chemie Lexikon, Georg Thieme Verlag, 1995.

* cited by examiner a)

b)

COATING COMPOSITION FOR OFFSET PAPER

TECHNICAL FIELD

The present invention relates to a coating composition in particular for sheet-fed lithographic offset printing paper, as well as to a paper coated with such a coating, and to methods for applying such a coating to a substrate.

BACKGROUND OF THE INVENTION

One important application of wood-free coated fine paper is in the field of sheet-fed lithographic offset printing processes. There is a clear trend in this market towards shorter times to re-print and for converting in order to reduce the time of the production process and to facilitate handling.

Printers will have a clear advantage when paper can be almost instantly re-printed and converted (i.e. within 0.5 hours) as this is leading to a much higher efficiency of the process. Workflow in the printing industry today has been fully digitized, enabling same-day processing of a complete print-job (like e.g. CD-inserts), provided that the print-process in itself would enable to do so. The only component in the complete workflow that prevents speeding up of the full process is the interaction ink-paper, i.e. sufficient drying before converting. One can therefore say that ink drying time is the bottleneck or the rate determining step in the full sheet-fed lithographic offset printing process.

There is a belief that the shorter time to converting requires both an adequate physical drying component as well as a sufficient (but not necessarily 100% completed) chemical drying component of printed ink.

As supported by results of several studies, the physical drying component can e.g. be increased by adjustment of the porosity and/or of the surface energy of coating layers in a way that:

- initial ink setting during residence time of the paper on the press is not too fast
- ink setting is as fast as possible for ink setting times directly after printing.

An induction period with respect to initial ink setting is necessary to avoid runnability problems on the press and to avoid loss in quality of the printed surface. Adjustment of surface energy appears also to be necessary to obtain superior print quality.

In the sheet-fed offset lithography printing process the quickset inks involved in general are mainly composed of ink colour pigment, at least partially unsaturated and/or conjugated resin, drying oil (which is an at least partially unsaturated and/or conjugated vegetable or biological oil) and a high boiling hydrocarbon (mineral) solvent (e.g. for adjusting the total flow characteristics). When printed on coated paper an initial physical absorption process starts, with adequately rapid rather selective penetration of the mineral oil phase into the paper coating and the raw paper-base. The residual resin- and drying oil rich phase precipitates due to the concomitant change of ink composition. It ends up with a relatively high viscosity and as a result it is (with ink colour pigment incorporated) more or less consolidated (often called “set”) on and somewhat in top of the coating surface, providing best conditions for optimal printing gloss properties.

In general such ‘set’ ink film is sufficiently rigid to withstand limited mechanical forces and enables the sheet to be re-printed on the second side of the sheet very soon after completing the first side. However its rigidity (especially wet rub resistance, abrasion resistance) normally has not well developed enough for ‘safe’ instantaneous further handling or converting (e.g. folding, cutting) of the printed paper without damaging printed images. In fact several hours up to a day or more might be needed before these next converting steps can be performed. In order to keep printing process economics viable, it is essential for printers to have this time interval minimised.

A well-known present method is to start up an additional chemical drying step of the printed ink layer, a so-called oxidative polymerisation or cross-linking reaction. Both the vegetable drying oil part, e.g. linseed oil, and the resin part are partly based upon (preferentially conjugated) unsaturated fatty acids. Oxygen in the air (or between the sheets in stack) adds to the double bonds of these fatty acids and resins to initially form hydroperoxides. After consecutive degradation of these hydroperoxides the resulting free radicals are very reactive. These radicals attack other fatty acid molecules and attach, forming new (larger) free radicals. This causes polymerisation to finally form a cross-linked ink network. The rate-determining step, formation and degradation of hydroperoxides, can appreciably be speeded up by the presence of special catalytic species (so-called primary/secondary/auxiliary driers or siccatives) in the ink. Possible is the addition of fatty acid salts (e.g. naphthenates or octoates) of transition type metals like cobalt to the ink prior to the printing. These catalysts are being added in small amounts to the printing inks, appreciably speeding up drying time from 100-200 h (non-catalysed situation) towards 1-10 h (catalysed situation). The complex mechanism of this ink cross-linking reaction path is visualised schematically in FIG. 1. This chemical drying can significantly improve resistance to mechanical forces.

Former catalytic drier systems in ink systems are similarly applied in e.g. commercial alkyd resin, solvent-based paints, also to speed up their chemical drying behaviour and to provide them with consumer-friendly behaviour. Latest developments on the paint market are water-based paint systems. In order to also speed up their chemical drying behaviour after application, specially adapted water-dispersible catalytic drier systems have been developed. In fact known primary/secondary/auxiliary drier systems have been modified with dedicated emulsifier combinations to make them sufficiently water-dispersible.

The present regular working method of printers therefore is to apply commercial inks with included catalytic drier systems and/or to add so-called drier systems to the ink prior to the printing to further speed up chemical drying. This however has several drawbacks. For instance a practical point is the appreciable reduction of the so-called ‘open time’ of the ink system, requesting a printer to clean-up the printing machine at the end of every regular 8 h working day cycle, or toxic anti-skinning agents like e.g. oximes have to be added to the ink. Another drawback is that a printer is forced to deal not only with standard ink but also to use several types of (more expensive) printing inks with an added drier system, depending on the absorptive and other printing properties of respective paper qualities.

SUMMARY OF THE INVENTION

The objective problem underlying the present invention is therefore to provide improvements for the printing process, in particular improvements allowing to reduce the time which has to be waited until the printed sheet-fed paper can be further treated, reprinted and/or converted.

The present invention solves the above problem in particular by providing a coating for an offset paper comprising a catalyst system for fixing polymerisable or crosslinkable constituents of the offset ink.

Such a catalyst system can be incorporated into any (aqueous) coating formulation, is however particularly active if it is incorporated into a coating structure showing an appreciable physical absorption of the offset ink into the interior of the coating. Typically such a rather quick ink-set behaviour is obtained if the coating structure has a high porosity with an adequate distribution of pore sizes. Preferably therefore, the top coat should have a quick set off as described in WO 2004/030917, the content of which is incorporated herewith in this respect. Preferred is an ink set-off of less than 0.7, less than 0.5 or less than 0.3 at 30 secs, preferably in the range of between 0.15 to 0.5 or an ink set-off of less than 0.1 or of less than 0.05 at 120 secs.

As catalyst system shall be understood a system comprising one or several (as a mixture) catalysts or catalytically active components eventually including additives, ligands, salts etc. supporting the total activity of the catalyst system. It is possible to e.g. support the catalytic effect by providing slow oxygen- or hydrogen-peroxide releasing compounds as additives.

One object of the present invention is therefore a coating according to claim 1, a paper according to claim 32, a method according to claim 34 as well as a use according to claim 36.

One key feature of the invention is therefore the fact that surprisingly it is possible to incorporate in particular water-dispersible or water-soluble catalytic (primary) drier systems, preferentially combined with a well-balanced ligand/chelate system and/or other additives, into the top coat layer (or also in the alternative into a middle coating, e.g. in order to hide sometimes possibly slightly coloured catalyst systems behind the top coat) of for example a wood-free coated grade for sheet-fed offset. In this way it is possible to provide a new type of graphical coated paper with intrinsic chemical drying potential incorporated directly in the paper-coat itself, in addition or even to replace the existing chemical drying potential of an ink system itself. Chemical ink drying time can be reduced appreciably by this approach among others for the following reasons:

- The chemical drying process is now started at both sides of the printed ink layer.
- In case of an adequate transportation process via physical absorption, unsaturated ink components to be chemically reacted (the catalysts are fixing polymerisable or crosslinkable constituents of the offset ink) are in closest vicinity with catalytic dryer species at the inside of the paper.
- In case of an adequate transportation process via physical absorption, the mineral oil then has been mainly separated, so the system to be cross-linked is more concentrated and thus reaction speed is enhanced.
- Due to the presence of oxygen in a porous coating system close to the catalytic species, oxygen diffusional limitations are minimised with best consequences for minimal induction time of chemical reaction.

In case of coatings according to the state-of-the-art, the chemical drying component (=cross-linking of biological oil vehicle and unsaturated resin part of the ink) seems, if at all, not to be significantly influenced by the paper surface. It can surprisingly be shown, that, as a matter of fact, incorporation of an appropriate catalyst system into the top coat of a paper reduces the chemical drying time sometimes even more than does the corresponding incorporation of a catalyst system into the ink. In addition to that, surprisingly, such drier systems which are added to the coating are stable even if the paper is stored for a long time (typically six months to one year). In particular the synergistic combination of driers added to the in the ink and driers present in the coating can lead to drying times which are far below values that can be achieved using systems according to the state-of-the-art. The catalyst catalyzes the oxidative polymerisation or the crosslinking of unsaturated constituents of offset ink printed onto the coating. In particular the catalyst fixes at least partially unsaturated and/or conjugated fatty acid and resin parts of the offset ink.

It is to be noted that the concept according to the present invention is completely and fundamentally different from ones as for example disclosed in JP 60-161461, in which a coating for sealingly covering certain items is disclosed. In this document the sealing coating comprises specific melamine constituents which, immediately after or during the coating process, are cross-linked. While the substrate to be covered with such a coating may have been printed prior to the application of the sealing coating, the formed structure of the sealing coating will not allow subsequent printing by common techniques, in particular not by means of offset printing. In these cases the catalyst is present in the sealing coating formulation prior to and during the coating process but will, immediately after the coating, not be present any more as it will be used up for the crosslinking of the melamine part during and immediately after the coating process. This then leads to a coating which completely seals the surface of the underlying structure.

Such types of coatings therefore differ from the coating as proposed in that the catalyst may not act as a catalyst for an offset ink applied later on, in that the structure formed using such a coating will not be able to be used as an offset paper since it will not be able to take up any offset ink and any possibly remaining catalyst will therefore not be available to e.g. offset ink being deposited on the surface of the sealing coating. The catalyst system provided in JP 60-161461, which is described to be p-toluenesulfonic acid, thus in the first place does not cross-link offset printing inks, and in the second place is not available after the coating has solidified. In contrast to that, the presently proposed coating aims at the provision of a system, in which a catalyst system for offset inks is available in a printable structure.

The drying time of offset printing ink applied to such a coating can be reduced below 2 h, even below 1 h, and in some cases to values equal or below 0.5 h.

In principle, primary drier systems which are known as additives for offset printing inks can be used as catalysts for the coating according to the invention. In a first preferred embodiment of the present invention, the catalyst is a transition metal complex or a transition metal salt, wherein preferentially the metal ion of the transition metal complex or salt is selected from the group of Ti, V, Cr, Ni, Mn, Fe, Co, Ce, Cu, or a mixture thereof.

A transition metal complex is a complex formed of one or more transition metals or in other words it is a coordination compound of transition metals (see for example: key word “Übergangsmetallkomplexe” in Römpp Chemie Lexikon, Georg Thieme Verlag, 1995). This is a term well-known to the person skilled in the art in general chemistry and in particular but not exclusively for example in inorganic catalysis, and a transition metal is defined according to IUPAC-rule 1.21 of inorganic chemistry as to be elements the atoms of which have an incomplete d-shell or which are able to form cations with incomplete d-shells (see for example: key word “Übergangsmetalle” in Römpp Chemie Lexikon, Georg Thieme Verlag, 1995).

Generally, the catalyst may be of the following structure:

$$(M^{+n})(X^{-k})_m$$

wherein M is selected from the group of transition metals like V, Mn, Fe, Co, Ni, Cu and Ce; $X^{-k}$ represents neutral (k=0) or charged (k< >0) ligands like nitrates, sulfates, phosphates, oxalates, salicylates, other carboxylates, naphthenates, EDTA, DTPA and NTA, amino acids and the like as also given below; and +n is the valence state of the metal, −k the valence state of a charged ligand (X), and m is the number of ligands.

It is to be pointed out that all X may be equal but they may also be several different ligands X with one M, e.g. some of them charged and some not. So e.g. the catalyst may in addition to charged ligands comprise a neutral ligand like an organic ligand, especially an organic ligand containing two or more nitrogen, oxygen and/or sulphur atoms, such as 2,2-bipyridyl, imidazoles, pyrazoles, aliphatic and aromatic amines, 1,10-phenanthroline, 1,4,7-trimethyl-1,4,7-triaza-cyclo-nonane and other ligand systems.

As ligands (above $X^{-k}$) for the transition metal complex systems like sulfates and carboxylates (especially C6-C18 aliphatic carboxylates) and/or those that facilitate the electron transfer to the oxidized metal, such as salicylates, EDTA, DTPA and NTA, amino acids and the like are possible. Examples are: acetyl acetone (AA), dibenzoyl methane (DBM), Dipivaloylmethane (dpm)=2,2,6,6-tetramethyl-3,5-heptanedione, EDTA, e.g. Dissolvine E39 or Trylon C (both EDTA-Na4=ethylene-di-amine-tetra-aceticacid, tetra-sodium salt), NTA like Dissolvine A40 (NTA-Na3=nitril-tri-aceticacid, trisodium salt), HEDTA like Dissolvine H40 (HEDTA-Na3=hydroxy-ethyl-ethylene-di-amine-tri-aceticacid, tri-sodium salt), EDG like Dissolvine EDG (EDG-Na2=ethanol-di-glycinate, disodium salt), DTPA like Dissolvine E40 (DTPA-Na5=di-ethylene-tri-amine-penta-aceticacid, penta-sodium salt), sytems like Dissolvine E-Mn-13 ([EDTA·Mn]Na2), Dissolvine E-Mn-6 ([EDTA·Mn]K2), etc.

Further possible are Schiff-base type ligands as given below e.g. as SB1, SB2 and SB4, wherein SB1 can be obtained in a reaction of pyridine-2-carbaldehyde plus 1,2-ethylene:diamine (1:1 equivalents) in ethanol at room temperature, wherein SB2 can be obtained in a reaction of pyridine-2-carbaldehyde plus 1,3-diaminopropane (1:1 equivalents) in ethanol at room temperature, and wherein SB4 can be obtained in a reaction of pyridine-2-carbaldehyde plus 1,3-diaminopropane (1:1 equivalents) in ethanol at room temperature.

SB1:

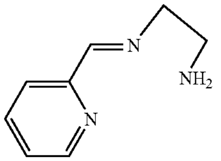

SB2:

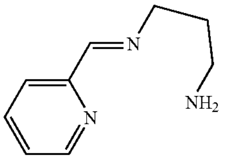

-continued

SB4:

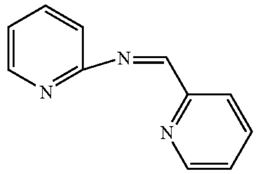

It is to be noted that at least the above-mentioned ligand SB2, which is the preferred of the above three ligands, is completely new and inventive also as such taken alone as well as in a complex with a transition metal as e.g. Fe or Mn, and not only within the specific use as described herein, namely as a ligand for the catalyst for a paper coating.

Furthermore, the following Schiff-base type ligands SB13 and SB14 are possible, wherein SB13 (preferred) can be obtained via a reaction of pyridine-2-carbaldehyde plus 1,3-diaminopropane (2:1 equivalents) in ethanol at room temperature, and wherein SB14 can be obtained via a reaction of salicylaldehyde plus 2-aminomethyl:pyridine (1:1 equivalents) in ethanol at room temperature.

SB13:

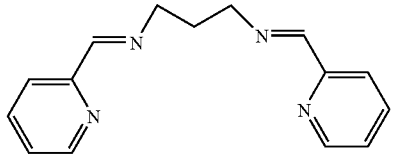

SB14:

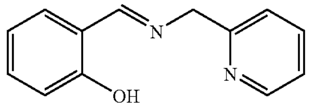

It is possible that the catalytic system and/or the coating additionally comprises a reducing compound like for example a reducing bio-molecule. Such a system can undergo a transition metal catalysed auto-oxidation. Possible are for example mono-, oligo- and polyhydroxy-substituted (hetero)-aromatic compounds like tocopherol, hydrochinon, catechol, pyrogallol, (hydroxy)-dopamine, epinephrine, ascorbic acids, derivatives and combinations thereof.

Preferably the catalytic system does not comprise a reducing component.

Particularly preferred are primary drier catalysts which are based on a transition metal selected from the group of Mn, Co, V, Fe or a mixture thereof, wherein in particular Mn alone proved to be particularly powerful and efficient.

The effect of primary drier catalyst systems as given above can be supported by so-called secondary driers which are additionally present. Such secondary driers can be based on Pb, Bi, Ba, Al, Sr, Zr e.g. in ionic form as salts, e.g. carboxylates, complexes or the like.

Even further or alternative support of the catalytic effect can be generated if auxiliary driers are additionally added like e.g. Ca, Zn, Li, K, again in ionic form as salts, e.g. carboxylates, complexes or the like.

As mentioned above, catalytic activity of the catalytic system can be supported by the presence of slow hydrogen-peroxide or oxygen-releasing compounds, preferably (coated and/or phosphate-intercalated) inorganic oxygen releasing compounds, as part of the catalyst system. Examples of (slow) oxygen (or $H_2O_2$) (coated) releasing agents are e.g.: Sodium perborate•monohydrate, Sodium perborate-tetrahydrate, Sodium percarbonate, Magnesium peroxide, ORC=phosphate-intercalated MgO2 (supplier Regenesis), with slow-release properties up to 1 year, magnesium or calcium (per)oxides like e.g. Ixper 35M or Drillox M (supplier Solvay), Ixper 75C (supplier Solvay), Ixper 60C (supplier Solvay), PermeOx Plus (supplier FMC), Zinc peroxide, Potassium monopersulphate.

According to another preferred embodiment the transition metal complex/salt which is used as the catalyst is a carboxylate and/or a naphthenate complex. In case of a carboxylate complex/salt, carboxylates with an alkyl chain of 2-18 carbon atoms, preferably of 6-12 carbon atoms, which may be unsubstituted or substituted can be shown to be efficient. A particularly suitable system is a 2-ethylhexanoate-complex, in particular a Mn (2-ethylhexanoate)-complex. Also simple Mn-salts show effect. In case of a naphthenate complex/salt, the naphthenic acid anion has an alkyl chain of 1-12 carbon atoms, preferably of 4-8 carbon atoms, and the alkyl chain as well as the cyclopentane unit may be unsubstituted or substituted. According to another preferred embodiment of the coating according to the invention, the transition metal complex/salt used as the catalyst comprises or is supplemented by at least one bidentate ligand. Such a bidentate ligand can advantageously be used in combination with the above-mentioned carboxylate or naphthenate ligand system. Particularly useful are bidentate systems which lead to chelate-rings with e.g. 5 atoms. The atoms which are used for providing the link to the metal atom may be selected from the group N, O, S, and/or P or combinations thereof. Therefore, useful bidentate systems include organic molecules with appropriate $sp^3$ or $sp^2$ hybridised N-atoms and/or O-atoms which are available for forming a bond to the metal atom.

Particularly preferred are ligands in the form of a diamine or alkanolamines, like for example selected from the group 2,2'-bipyridine (bpy), 2-aminomethylpyridine, 2-hydroxymethylpyridine, or 1,10-phenanthroline, which may be substituted or unsubstituted. The ligands are preferably substituted by side groups, which increase the stability and/or increase the solubility or dispersibility of the catalyst system in water, which is important since coatings are deposited onto a substrate on a water basis.

A particularly suitable system is given by a catalyst consisting of or comprising a Mn bpy system, in which e.g. Mn is present as a salt complex and additionally bpy is present, typically in (slight) molar excess. As mentioned above, such a system can be provided as a combined system with a Mn carboxylate or a Mn naphthenate, suitable is for example a combination of Mn (2-ethylhexanoate) with bpy as Mn (2-ethylhexanoate, bpy).

According to another preferred embodiment of the coating according to the invention, the catalyst, i.e. the metal part of the primary drier complex/salt, is present in the coating in 0.01-0.5 weight-% of the total dry weight of the top paper coating, preferably in 0.05-0.2 weight-% of the total dry weight of the coating.

In addition it can be shown that superior catalyzing efficiency can be achieved if one of the ligands is present in well balanced and controlled excess compared to the transition metal ion of the primary drier system. Therefore, according to another preferred embodiment, the transition metal complex/salt preferentially comprises at least one bidentate ligand and the ratio of metal to ligand is in the range of 1:1-1:8 or up to 1:20.

In order to provide a catalyst system which is adapted to the process of coating in the paper machine, it is advantageous to add additives for increasing the solubility/dispersibility of the transition metal complex and/or the ligands present. Additives for enhancing dispersibility can e.g. be chosen from alcohols or glycol-ethers like e.g. 1-methoxy-2-propanol or propylene-glycol-monomethyl-ether. Those additives can either be added to the coating formulation or they can be added to the solution/dispersion of the transition metal complex and/or the other components prior to its introduction into the coating formulation.

Such additives for increasing the solubility/dispersibility of the transition metal complex and the ligands are acting as 'co-solvents'. A specific property of these is that they not only have a certain capability to dissolve components like a transition metal and/or a complexing agent/ligand or neutral ligand and/or an auxiliary drier, but simultaneously have a certain solubility in water. So they are some kind of intermediate ('solubilisation principle'). Advantages are:

Maximum activity of drier system in dissolved state

Improved stability and homogeneity of total paper coat, thus e.g. improved runnability at the paper machine Examples of suitable co-solvents: Ethanol, acetone, alcohol ethers, alcohol esters, N-methyl-2-pyrrolidone, diethyleneglycol monobutyl ether, propyleneglycol monomethylether, etc.

In principle, the present concept can be applied to any (aqueous) coating formulation. It however proves to be advantageous if the coating has a high degree of porosity and an appropriate morphology of the porosity and/or appropriate surface energy of pore walls e.g. leading to the above-mentioned preferred adequately quick physical adsorption of the ink and the corresponding adequately short set-off values. According to another preferred embodiment, the coating comprises 100 parts in dry weight of pigment substantially supplemented by 5-20 parts in dry weight binder and additives like lubricants, thickener etc., wherein the pigment part comprises fine to ultra-fine $CaCO_3$ and/or kaolin or clay wherein up to 10-20 parts may be substituted by synthetic solid or vacuolated polymeric pigments which may e.g. be made of poly(methyl methacrylate), poly(2-chloroethyl methacrylate), poly(isopropyl methacrylate), poly(phenyl methacrylate), polyacrylonitrile, polymethacrylonitrile, polycarbonates, polyetheretherketones, polyimides, acetals, polyphenylene sulfides, phenolic resins, melamine resins, urea resins, epoxy resins, polystyrene latexes, polyacrylamides, and alloys, blends, mixtures and derivatives thereof. Possible are also Styrene maleic acid copolymeric latexes (SMA) or styrene malimide copolymeric latexes (SMI), mixtures of these with the above mentioned structures and derivatives thereof.

In principle the catalyst is only added to the top coating, it may however also be added to layers which are beneath the top coat. The top coat comprising the catalyst system typically has a thickness in the range of 10-30 g/m$^2$, preferably in the range of 10-15 g/m$^2$.

The printing sheet or the coating may further be characterised in that at least a fraction of the pigment part, preferably a fine particulate silica, comprises or is even selectively and purposely enriched in traces of metals, preferably of transition metals, wherein at least one metal is present in more than 10 ppb or at least one metal or the sum of the metals is present in more than 500 ppb. This metal then acts as a catalyst in the above sense. E.g. iron may be present in such amount, but also copper, cobalt, manganese etc are advantageous.

Generally when mentioning silica in this disclosure, this term shall be interpreted to include colloidal silica (suspensions of fine size silica particles in the liquid phase, wherein the particles are amorphous and typically are both nonporous in structure and spherical in shape), precipitated silica (porous particles with a broad pore structure), fumed silica (nonporous) and silica gels (porous solid amorphous form of hydrous silicon dioxide with polymerized silicate particles as primary particles, wherein the particles have a high surface area, and a high porosity, for the definition of these four types see 'Handbook of Porous Solids', volume 3, Edited by Ferdi Schueth, Kenneth W. Sing and Jens Weitkamp, Wiley-VCH, e.g. pages 1551-1557). Preferably precipitated silica and even more preferably silica gels (Xerogels and Aerogels) with their inherent high porosity are used and are intended to mean if in the following the term silica is used.

The metal, be it in elemental or in ionic form, contributes to the chemical drying of the ink. A larger content in metal may e.g. compensate a lower presence in parts in dry weight of pigment with specific proper porosity and/or surface area, so for example if the pigment part comprises 80-95 parts in dry weight of a fine particulate carbonate and/or of a fine particulate kaoline, and 6 to 25 parts in dry weight of a fine particulate silica, the silica content may be smaller if it has higher metal contents. Preferably the content in silica gel should be higher than 10 parts, preferably it should be 12 parts or more.

There is 3 groups of metals which are particularly active as drier metals or related to drier function if present in one of the pigments, in particular in the silica fraction:

A) Primary or top or surface drier metals: all transition metals like Mn with both +2 (II) and +3 (III) valency. They catalyse formation and especially decomposition of peroxides, formed by reaction of $O_2$ with drying oils. This oxidative or free-radical chemistry leads to the formation of polymer-to-polymer crosslinks (=top drying) and also to formation of hydroxyl/carbonyl/carboxyl groups on the drying oil molecules. The most important ones are: Co, Mn, V, Ce, and Fe. Also possible are Cr, Ni, Rh and Ru.

B) Secondary or through or coordination drier metals: The O-containing groups are used by these driers (but always in combination with primary driers, via joined complex formation) to form specific cross-links. The most important ones are: Zr, La, Nd, Al, Bi, Sr, Pb, Ba.

C) Auxiliary drier metals or promoter metals: they themselves do not perform a drying function directly, but via special interaction with primary or secondary driers (or some say via increase of solubility of prim. and sec. driers) they can support their activity. The most important ones are Ca, K, Li and Zn, in particular their carboxylates.

Auxiliary drier metals may be metal carboxylates (e.g. dissolved in water or 2-butoxyethanol) like: Na-(2-EH) at 0.02-0.2% Na (on DS paper top coat); K-(2-EH) at 0.05-0.2% K; K-linoleate at 0.05-0.2% K; Li-(2-EH) at 0.01-0.2% Li; Ca-bis-(2-EH) at 0.05-0.2% Ca, wherein EH=Ethylhexanoate. These auxiliary drier metal carboxylates may also be used as the actual catalyst alone.

As secondary or auxiliary driers systems, it is possible to use: $Zr(acac)_4$; $Ti(acac)_4$; Li (acac); K(acac); Li(dpm); K(dpm). It can be shown, that Li(acac) at molar ratio 1:1 Li/Mn significantly enhances drying activity of Mn-acetate.

To have significant activity of these metals, they should be present in the pigment (preferably in the silica) from 10 ppb as lower limit up to the following upper limits:

Primary drier metals: all up to 10 ppm, except Ce: up 20 ppm.

Secondary drier metals: all up to 10 ppm, except Zr, Al, Sr and Pb: here all up to 20 ppm.

Auxiliary drier metals: all up to 20 ppm.

Some specific combinations of these metals are particularly effective, like e.g. Co+Mn, Co+Ca+Zr or La or Bi or Nd, Co+Zr/Ca, Co+La. Possible is e.g. a combination of Mn(II+III)acetate (only surface of ink is quickly dried and closed towards oxygen) with some K-salt (to activate Mn activity) and possibly with Zr-salt (to increase through drying of ink bulk, so to improve wet ink rub behaviour of printed ink layer).

According to another preferred embodiment, the coating of the printing sheet is characterised in that the top coat and/or a middle layer beneath the top coat further comprises a chemical drying aid, preferably selected from a catalytic system like a transition metal complex/salt, a transition metal carboxylate complex/salt, a manganese complex/salt, a manganese carboxylate complex/salt and/or a manganese acetate or acetylacetate complex/salt (e.g. $Mn(acetate)_n$ with n=2,3 as $Mn(II)(Ac)_2.4H_2O$ and $Mn(III)(Ac)_3.2H_2O$ or $Mn(acac)_n$ with n=2, 3), wherein for proper catalytic activity of Mn complexes/salts preferably Mn(II) as well as Mn(III) are present concomitantly, or a mixture thereof, wherein this chemical drying aid is preferably present in 0.5 to 3 parts in dry weight, preferably in 1 to 2 parts in dry weight. In case of a metal catalyst system like the above mentioned Mn complexes/salts, the metal part of the catalyst system is preferably present in the coating in 0.05-0.6 weight-%, preferably in 0.02-0.4 weight-%, of the total dry weight of the coating. To support or enhance the catalytic activity of such systems is possible to combine them with secondary dryers and/or auxiliary dryers. It is also possible to enhance the catalytic activity by providing different ligands for a metal system, so for example the above acetate complex/salt may be mixed with bpy-ligands. Also possible is the combination with other metal complexes/salts like Li(acac). Further enhancements are possible by combining the catalytic systems with inorganic peroxides to have the necessary oxygen or hydrogen-peroxide directly at the spot without diffusional limitations. It has to be pointed out that the use of such catalyst systems for fixing polymerizable or crosslinkable constituents of the offset ink is also advantageous for coatings of completely different nature and is not necessarily linked to the concept of having silica in a coating. The inorganic pigments may be intentionally enriched in such metal traces. Typically an iron content above 500 ppb is preferred and a manganese content above 20 ppb.

Examples of Drier System:

Dissolved in water or in co-solvent (2-butoxyethanol): a) Fe(II) $SO_4.7H_2O$, Fe(II)-(Ethylhexanoate), Fe(II) acetate, Fe(II) citrate, Fe(II) gluconate, Fe(II) EDTA at 0.004-0.2% Fe, Mn(II) $SO_4.H_2O$ at 0.2% Mn; b) Ligand 2-ethyl-4-ethylimidazole at 2 mol ligand/mol metal.

Colourless Mn(II)-salts as main primary drier, like Mn-sulfate, -phosphate, -carbonate, -chloride and especially Mn(II)-acetate. Advantages of mixture of colourless Mn(II)-[2-EH] plus brownish Mn(III)-[2-EH]: costs, safety properties, colour. It is possible to activate Mn(II) acetate (light pink), by in situ incorporating also minimum requested ionic form Mn(III) acetate (brownish). Such a system may be combined with ligands (like bpy, SB2, SB13) so that drier activity can be significantly and attractively enhanced.

More complex metal salts/complexes, evt. combined with ligands: ready-to-use 'one-package' primary drier systems. The principle is to pre-synthesize/pre-isolate the crystalline drier complexes, eventually already equipped with ligands. In mill practice one only needs to incorporate a single drier compound in the paper coating, being fully water-soluble or by means of a co-solvent. Examples:

[Mn(II+III) ethylhexanoate, bpy] complex=$[Mn^{II}_2Mn^{III}_2O_2(2\text{-ethylhexanoate})_6(bpy)_2]$ $[Mn(acac)_2$ bpy] where acac=acetylacetone $[Mn(acac)_3]$ or (water-soluble forms) $Na[MnII(acac)_2]$ or $K[MnII(acac)_2]$ or $NH4[MnII(acac)_2]$

[MnIII(pppy)(dpm)], where pppy is a new tripodal ligand

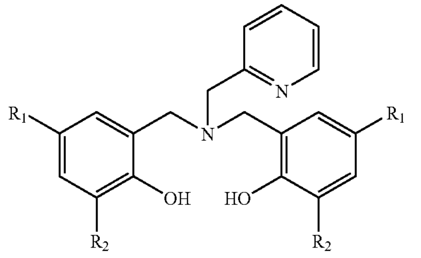

where R1=R2=H and dpm=dipivaloyl methane.

Also possible are transition metal based (preferably Fe, Mn) bleaching catalyst systems like the Omo Power catalyst MnMeTACN (Polymer 45 (2004) 7431-7436).

The present invention additionally pertains to a paper coated with a coating as given above, preferentially as a top coat. Beneath such a top coat there is preferably an additional coating, which in particular supports the physical absorption process of the ink in the layers structure. Possible is a formulation of the additional middle coating as follows: 100 parts in dry weight fine to ultrafine $CaCO_3$; 5-10 parts styrene butadiene synthetic binder; 1 part lubricant; 1 part modified starch; 1 part PVA; 1 part CMC.

Furthermore, the present invention relates to a method for the production of a coating as given above, wherein the transition metal complex/salt is added, preferentially as an aqueous solution or dispersion, to a stirred coating formulation, and the final coating formulation is coated onto a paper substrate. The coating process can be carried out using regular techniques like a blade coater, a roll coater, a spray coater, a curtain coater or other coater systems, and the paper may be calendered after the coating process.

According to a preferred embodiment of the above method, concomitantly with the addition of the transition metal complex/salt a chelating agent and/or complexing agents/ligand, preferably in excess to the transition metal content (on a molar basis), is added to the coating formulation, wherein the chelating agent is added as an aqueous solution or dispersion and may contain one or several additives (co-solvents using the solubilization principle) to increase the solubility/dispersibility or to increase the stability of the catalyst system or of its constituents.

Further, the present invention relates to the use of a catalyst for fixing polymerisable or crosslinkable constituents of the offset ink as an additive for a coating. Such a catalyst is preferentially a water soluble or water dispersible transition metal complex/salt, and has the characteristics as outlined above.

Further embodiments of the present invention are outlined in the dependent claims.

SHORT DESCRIPTION OF THE FIGURES

In the accompanying drawings preferred embodiments of the invention are shown in which.

Figure 5:
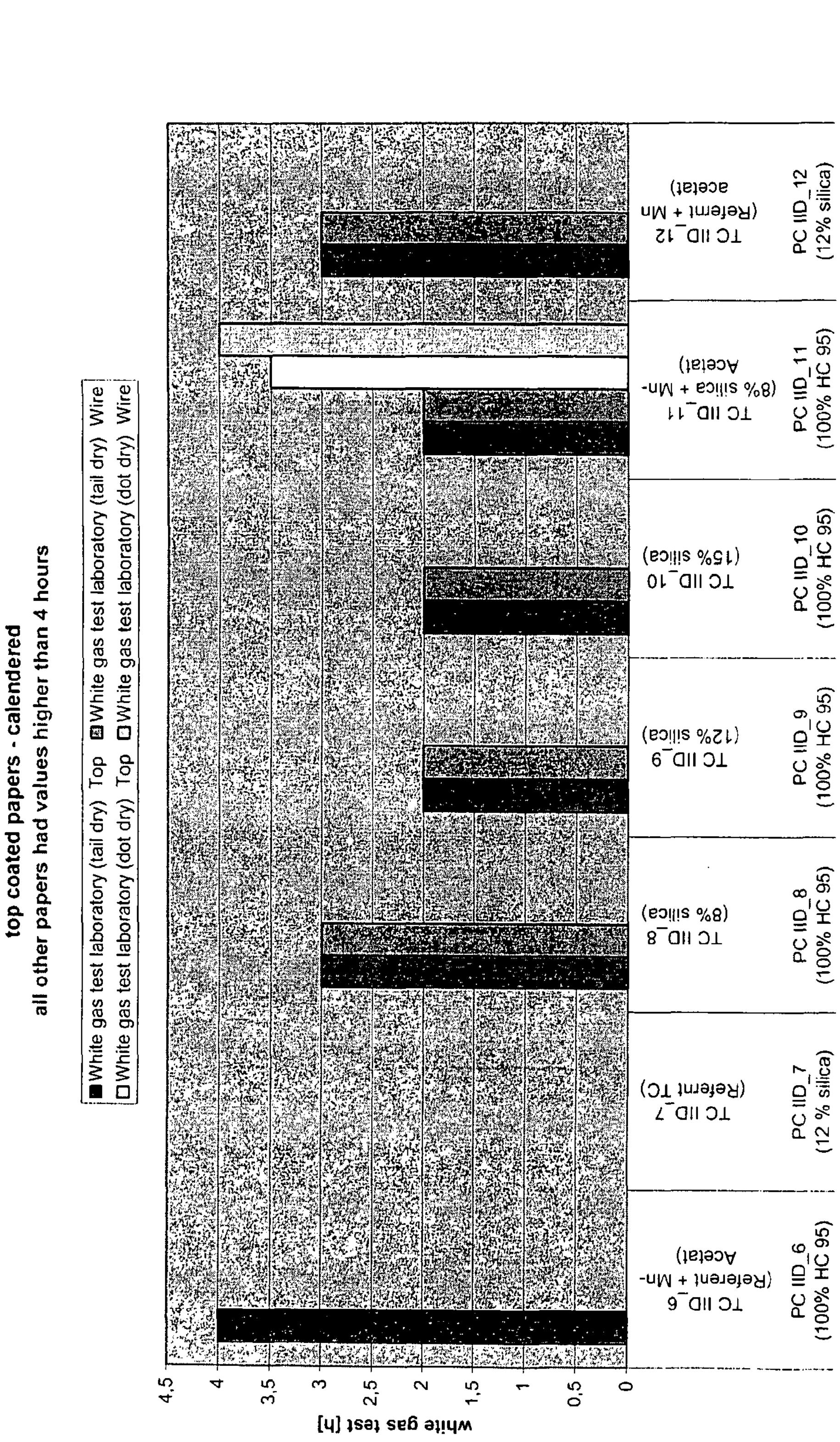
Figure 6:
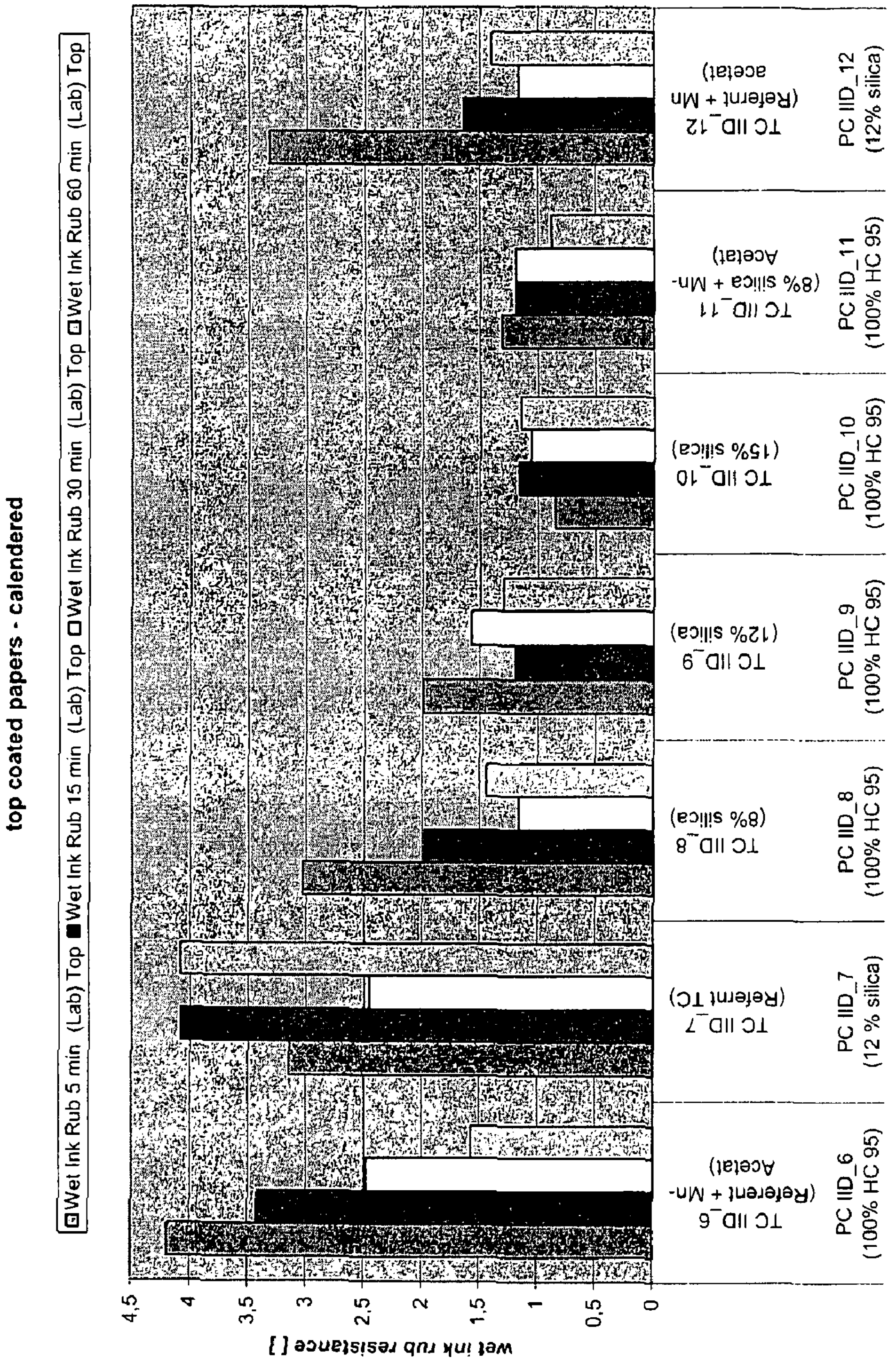
Figure 7:
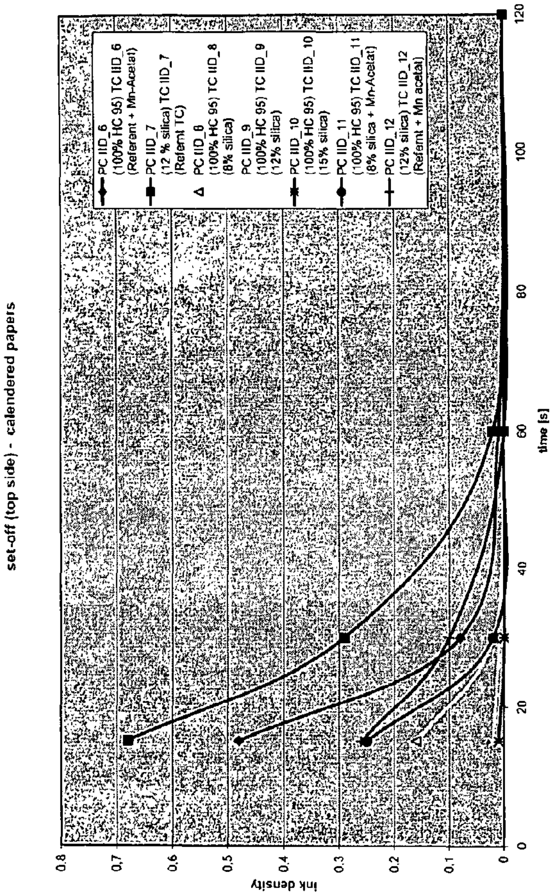
Figure 7:
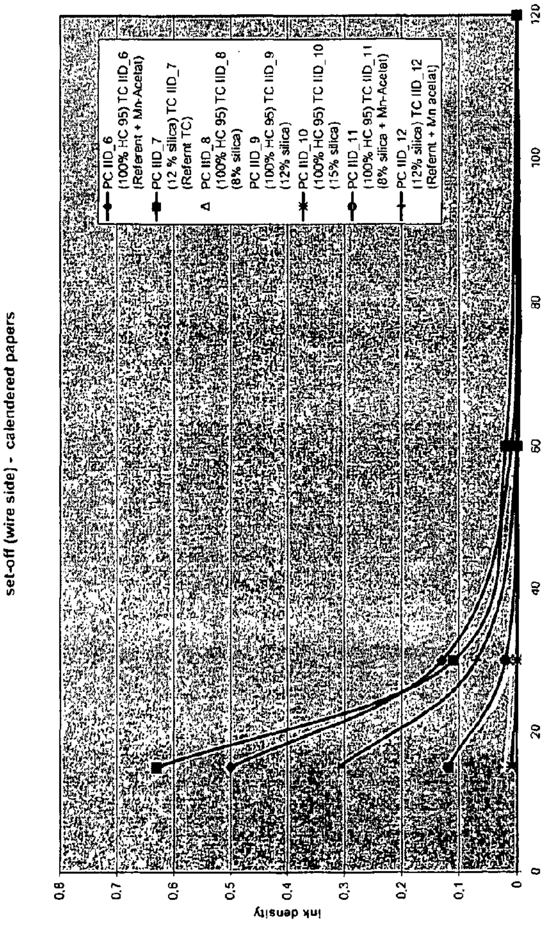
Figure 8:
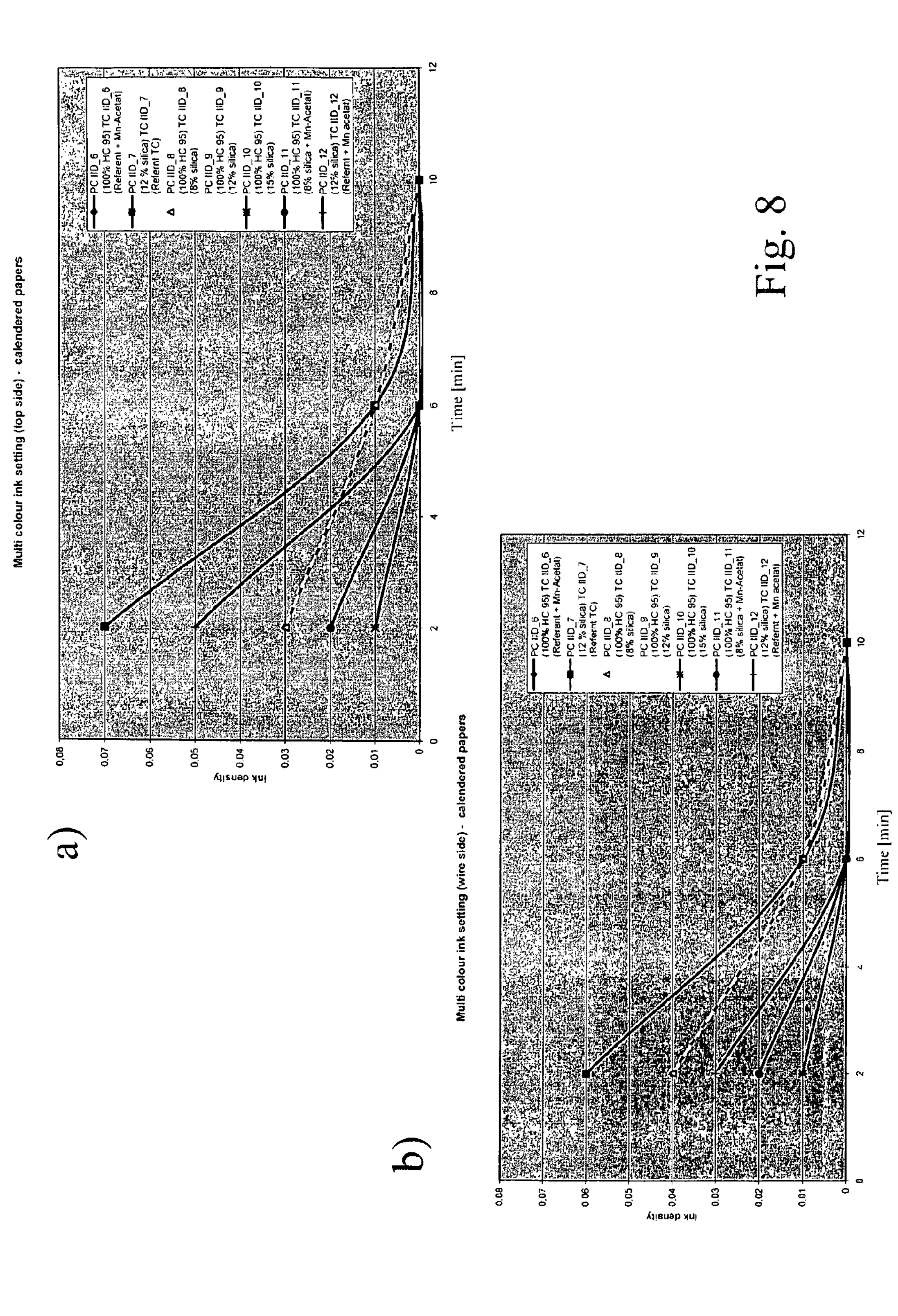
Figure 9:
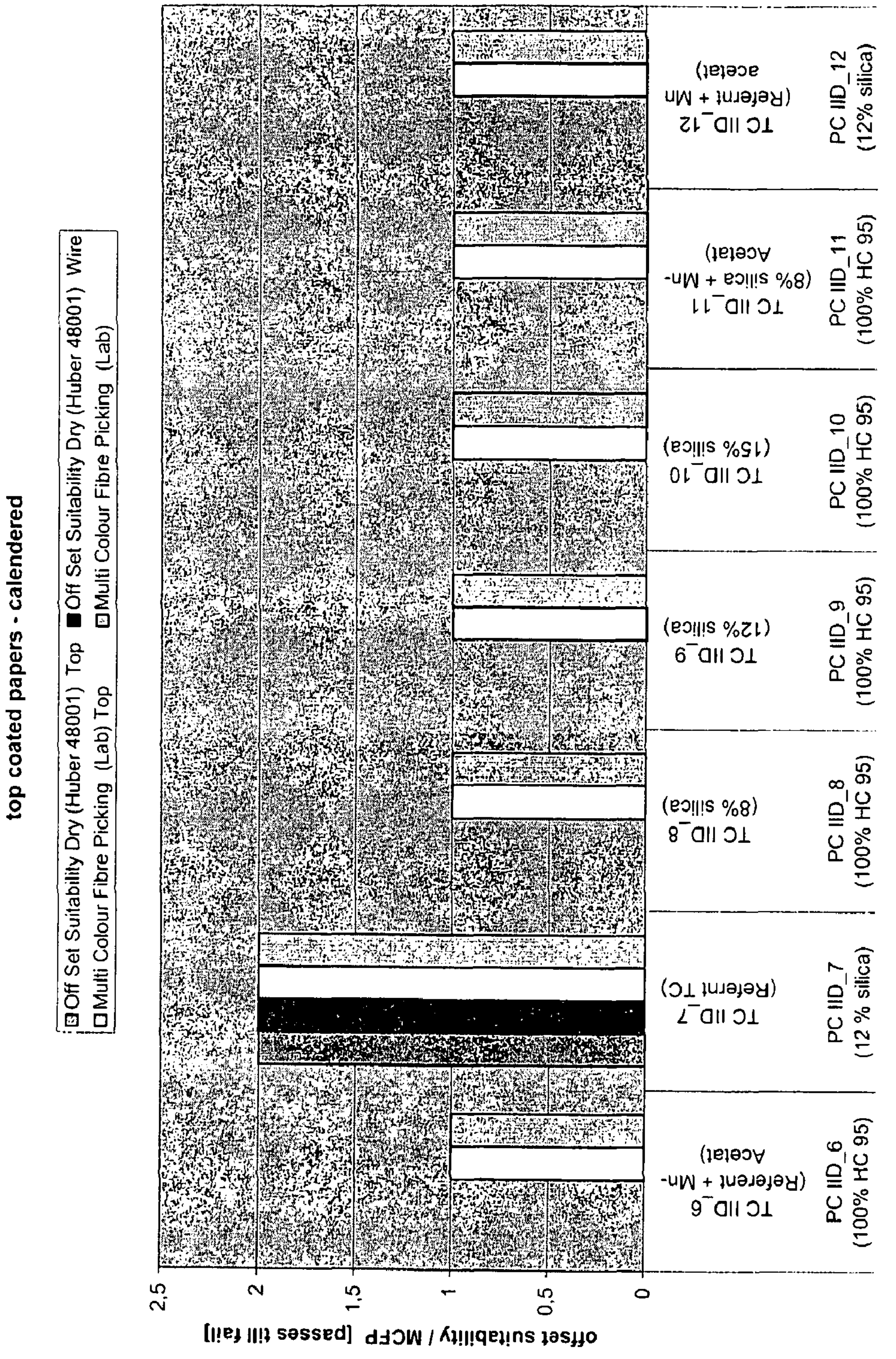
Figure 10:
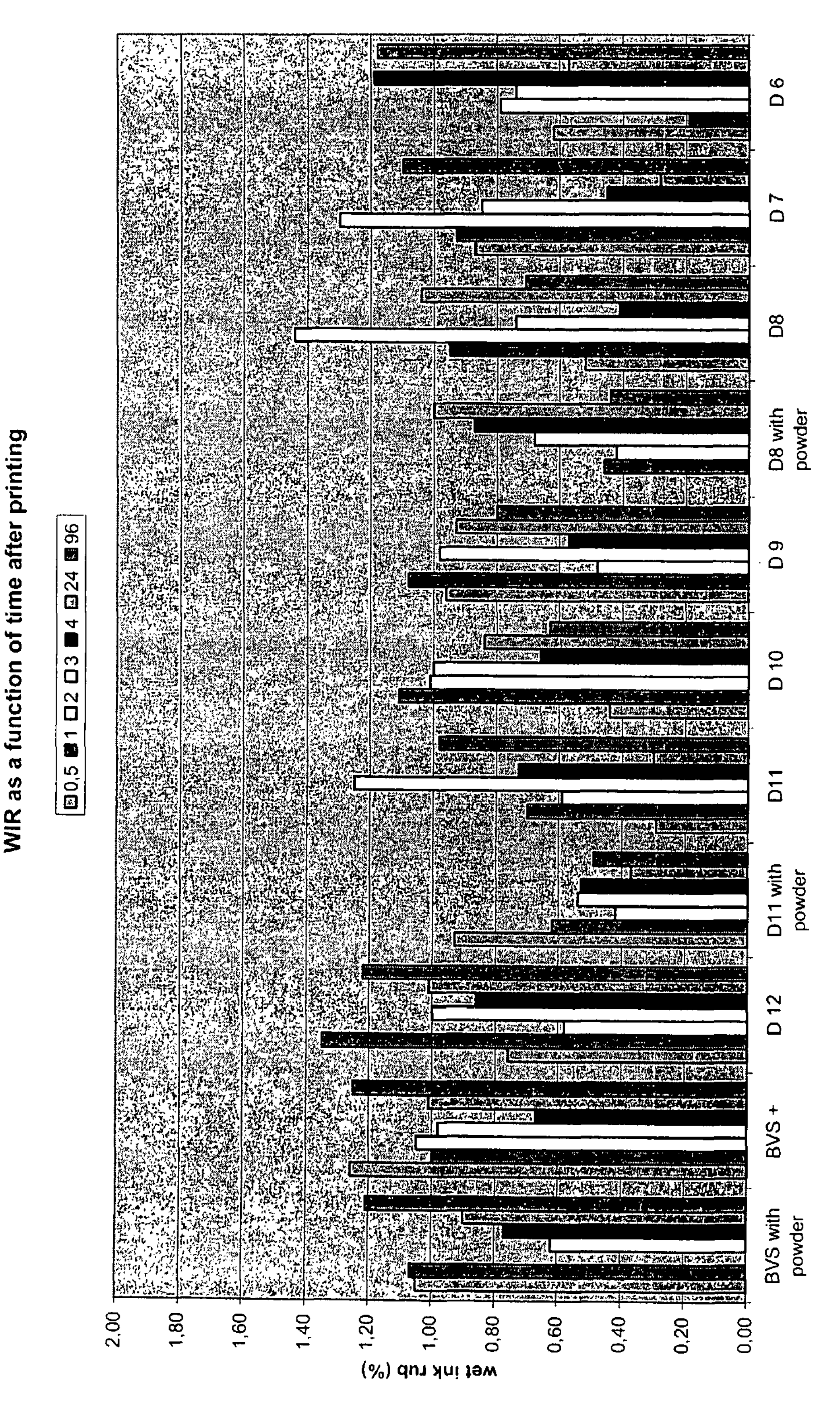

FIG. 5 white gas test results of calendered papers;

FIG. 6 wet ink rub resistance test results of calendered papers;

FIG. 7 set off values for top-side (a) and wire side (b) of calendered papers;

FIG. 8 multi colour ink setting values for top-side (a) and wire side (b) of calendered papers;

FIG. 9 offset suitability and multicolour fibre picking (MCFP) for calendered papers; and FIG. 10 wet ink rub test results for calendered papers.

DETAILED DESCRIPTION OF THE PREFERRED EMBODIMENTS

It was surprisingly established that under laboratory printing conditions (Pruefbau testing apparatus, no Fount solution) a significant reduction in chemical drying time of printed ink layer (commercial Black Tempo Max, BTM, available from SICPA, CH) on regular paper available under the trade name MagnoStar from the applicant is possible. For that purpose a water-dispersible manganese based catalytic dryer complex Mn— (2-ethylhexanoate) was homogeneously incorporated in the topcoat, preferentially completed with a second ligand bpy. With only complex Mn— (2-ethylhexanoate) at 0.2 wt.-% Mn, chemical drying time (evaluated via Thumb test) of printed BTM ink was reduced from 4 h (blank) to 2 h (=50%). In the presence of a faster setting middle-coat layer, drying time was lowered about 1 hour extra: from 3 h (blank) to 1-2 h. At additional presence of bpy, results were even further improved: at 0.1 wt.-% Mn and a molar ratio bpy/Mn=6, a chemical ink drying time 0.5-1 h (=12.5-25%) was achieved. At 0.2 wt.-% Mn and bpy/Mn=3 a chemical ink drying time as low as 0.5 h (=12.5%) could even be reached.

Experimental Details

Materials

Chemical Drier Complex

Nuodex Web Mn9: 9.0±0.2 wt.-% of manganese as Mn—(2-ethylhexanoate) complex, and containing special surfactant mix to make it suitable for water-borne systems, commercially available from Elementis Servo, Delden, NL.

Drymax (commercially available from Elementis Servo, Delden, NL): a chelating agent used for additional manganese drier acceleration. It contains about 30 wt.-% 2,2'-bipyridyl (bpy, superactive ligand for manganese, next to 2-ethylhexanoate) and about up to 60 wt.-% N-methyl-2-pyrrolidon (non-active material, co-solvent to increase aqueous solubility of bpy).

Paper Substrate

A: Regular MagnoStar papers without topcoat layer, meant for 250 gsm end-paper quality. The surface coating layer of this substrate without topcoat layer was containing 100 parts in dry weight rather coarse $CaCO_3$; 10 parts synthetic latex binder; 1 part modified starch; 1 part PVA; 1 part CMC; 1 part lubricant.

B: Experimental mill produced paper with specific porous middle layer without topcoat, meant for 250 gsm end paper. The surface coating layer (after application of the top coat acting as porous middle layer) of this substrate without topcoat layer was containing 100 part fine (not ultrafine as in topcoat and not rather coarse as it is regular) $CaCO_3$; 10 parts styrene butadiene synthetic binder; 1 part lubricant; 1 part modified starch; 1 part PVA; 1 part CMC.

Paper Top Coat 100 parts in dry weight ultra-fine $CaCO_3$; synthetic latex binder 10 parts; modified starch 1 part; PVA 2 parts; lubricant Ca-stearate 1 part; synthetic thickener as further needed to set viscosity behaviour, e.g. 0.05 parts.

Printing Ink

Tempo Max (SICPA, CH), black. Like most commercial inks, no specification available of composition and unsaturation value. Selected as oxidatively rather 'quick drying' model ink. Probably contains limited amount of some drier complex.

Bio 2 (BASF/K&E, DE), cyan: specially prepared 100% biological model ink for paper-ink interaction study. Composition: 17 parts ink pigment+60 parts bio binder+9 parts alkyd resin+9.5 parts bio oil+2 parts special additives+2.5 parts siccative+0 parts mineral oil. No details available of composition and unsaturation value of biological part.

Incorporation Drier Complex in Top Coat/Top Coat Application

Small amounts of Nuodex Web Mn9 and (if required) Drymax are simultaneously added slowly (via two feeding devices) into well-stirred topcoat formulation (marine type stirrer) in a small open vessel for about 10 minutes at room temperature. Metal and ligand were added as requested, the specific figures can be found in the tables.

In case the active drier complex is assumed to be an octahedral surrounded mono-metal/ligand complex, 1 to (maximum) 8 moles bpy versus 1 mole manganese metal should be possible. It is however presumed that the complex is a polynuclear complex with several metal atoms within one moiety.

In case of certain thickening behaviour of coating after complex addition, it suffices to add some additional dispersant, e.g. Polysalz type.

Topcoat plus incorporated drier have been applied with available Bird applicator or with a lab-scale pilot coater onto one side of dual coated A or B substrate. Applied topcoat amount was tested as about 15 $g/m^2$/side with layer thickness about 11-12 μm. This fits well in with mill practice for these topcoats.

Laboratory Printing Method

After conditioning the coated paper samples (with and without incorporated drier) in accordance with GTM 1002, printing ink (black) Tempo max or (blue) Bio 2 is applied onto paper samples at Prüfbau printing device according to directions of ESTM 2302, Multicolour ink setting, revision 0 of Nov. 2, 2004. It means 0.24 g ink, printing pressure 1000N, printing speed 0.5 m/s, with aluminium printing reels and with standard long sample carrier.

Remark: Printed ink layer thickness was measured as about 1-2 μm.

Analytical Drying Test Methods

All analytical measurements have been performed on conditioned papers (GTM 1002) in conditioned laboratory. Following analytical drying test methods have been selected and applied:

Physical 'setting' time of printed ink:

Set-off test (ESTM 2301): a paper sample is printed (100%) with a standard ink (Huber 520068) at the Prufbau printing device. After several relatively short time intervals (15, 30, 60, 120 s), a part of the printed sample is countered (top versus bottom) against the same blank paper. The density of the transferred ink of each area on the counter paper is measured and plotted against time. This method is reported to describe the measurement of the (physical) set-off (pile simulation) of papers used for sheet-fed offset printing.

Chemical Drying Time of Printed Ink:

Thumb test, (non-standard): in line with general practice of commercial printing (and also in paint testing area) at several time intervals (15, 30, 60, 90 . . . minutes) a thumb, covered with (special) house-hold tissue paper (to avoid influence of skin grease), is firmly (but always at about same force) pressed and simultaneously turned over 90° in the printed ink layer. In case of fully wet stage all ink is wiped off, leaving a clear white spot on paper substrate. In case of fully chemically dried ink no injury can be seen. It is preferred that one and the same operator is performing all series. It is to be noted that the thumb test is indicative of a combination of chemical and physical drying. However, it can be shown that the principal contribution to the thumb test results is the chemical drying.

Results

The investigations in this report are to be subdivided into three main parts:

Part 1: Pre-assessment of Intrinsic Catalytic Ink Drying Activity of Used Manganese Dryer Product Nuodex Web Mn9 Added to the Ink.

For this purpose the physical and chemical drying performance of Black Tempo Max printing ink without ('as such') and with additionally mixed in Nuodex Web Mn9 product [0.1 and 0.5 wt.-% Mn in form of Mn— (2-ethylhexanoate) complex] as printed upon commercial MagnoStar 250 gsm paper was determined. Furthermore 250 gsm commercial paper substrates Paper 1, Paper 2 and Paper 3 were evaluated correspondingly as printing substrates for the sake of comparison, in order to rank drying behaviour (and in a certain way its converting ability) of present MagnoStar quality relative to that of well drying commercial papers in the market.

Thumb test analysis of several commercial 250 gsm WFC (woodfree coated) papers, printed with Black tempo Max ink 'as such' was carried out. It was seen that there is dramatic differences between the behaviour of different paper substrates, so the Paper 1 shows quick drying behaviour, while Magnostar shows relatively slow drying behaviour. The results are summarised in table 1.

Thumb test analysis of several commercial 250 gsm WFC papers, printed with Black tempo Max ink +0.1 wt.-% Mn and 0.5 wt.-% Mn, respectively, was carried out. An improvement in the drying behaviour in particular of MagnoStar was clearly observed. The results are also summarised in table 1.

Part II: Incorporation of Mn— (2-Ethylhexanoate) Catalytic Dryer Complex in Paper Topcoat to Enhance Chemical Ink Drying Performance The required amounts manganese complex (0, 0.05, 0.1 and 0.5 wt.-% Mn given as weight % of metal of the primary drier compared to dry weight coating formulation) as Nuodex Web Mn9 were mixed into topcoat composition (see above). Treated topcoat was Bird applied to middle-coated paper substrate for 250 gsm end paper: A and B. End paper was laboratory printed and tested for drying behaviour.

Results were as follows:

Thumb test analysis of MagnoStar 250 gsm end paper with incorporated Mn— (2-ethylhexanoate) catalytic dryer complex in varying amounts, printed with Black tempo Max ink was carried out. One could easily recognize the increasing speed of chemical drying for increasing catalyst concentration. The results are summarised in table 2.

Thumb test analysis of 'fast setting' MagnoStar 250 gsm end paper with incorporated Mn— (2-ethylhexanoate) catalytic dryer complex, printed with Black tempo Max ink was carried out. The results are summarised in table 2.

Part III: Incorporation of Mn— (2-Ethylhexanoate, Bpy) Catalytic Dryer Complex in Paper Topcoat to Enhance Chemical Ink Drying Performance Complementary to part II, in this part next to Mn— (2-ethylhexanoate) complex also several excess amounts ligand bpy (as Drymax product) have been (separately) mixed into topcoat, in order to intentionally react 'in situ' to Mn— (2-ethylhexanoate, bpy) dryer complex. Next to printing ink Black Tempo Max also Bio 2 type ink was applied at laboratory printing.

Results were as follows:

Thumb test analysis of 'regular' MagnoStar 250 gsm end paper with incorporated Mn-(2-ethylhexanoate) catalytic dryer complex without additional bpy, printed with Black tempo Max ink was carried out. The results are summarised in table 3.

Thumb test analysis of 'regular' MagnoStar 250 gsm end paper with incorporated Mn-(2-ethylhexanoate, bpy) catalytic dryer complex, at 0.1 wt.-% Mn and with varying excess bpy printed with Black tempo Max ink was carried out. Here the dramatic increase in chemical drying speed in the increasing presence/excess of bpy becomes obvious, and the results are summarised in table 3.

Thumb test analysis of 'regular' MagnoStar 250 gsm end paper with incorporated Mn-(2-ethylhexanoate, bpy) catalytic dryer complex, at 0.2 wt.-% Mn and with varying excess bpy printed with Black tempo Max ink was carried out. The effect is even more pronounced here than in table 3 and with 0.2% Mn with 1.68% bpy the drying time goes down to less than 0.5 h, as can be seen from table 4.

Very similar results are obtained if printed with Bio 2 ink:

Thumb test analysis of 'regular' MagnoStar 250 gsm end paper with incorporated Mn-(2-ethylhexanoate, bpy) catalytic dryer complex, at 0.1 wt.-% Mn and with varying excess bpy printed with Bio 2 ink was carried out. The results are summarised in table 3.

Thumb test analysis of 'regular' MagnoStar 250 gsm end paper with incorporated Mn-(2-ethylhexanoate, bpy) catalytic dryer complex, at 0.1 wt.-% Mn and with varying excess bpy printed with Bio 2 ink was carried out. The results are summarised in table 3.

Thumb test analysis of 'regular' MagnoStar 250 gsm end paper with incorporated Mn-(2-ethylhexanoate, bpy) catalytic dryer complex, at 0.2 wt.-% Mn and with varying excess bpy printed with Bio 2 ink was carried out. The results are summarised in table 4.

Discussion

Conclusions Part I, Pre-assessment of intrinsic catalytic ink drying activity of used manganese dryer product Nuodex Web Mn9

Results of Thumb tests of printed Black Tempo Max ink (as such or with added commercial manganese dryer) on some 'best in class' commercial 250 gsm WFC papers in the market with respect to drying/converting performance are presented in Table 1. Corresponding MagnoStar 250 gsm (commercial end product) drying test results were also included.

TABLE 1

| Chemical ink drying time (h) via Thumb test | BTM ink as such | BTM ink + 0.1 wt.-% Mn | BTM ink + 0.5 wt.-% Mn |
|---|---|---|---|
| Comparative Paper 1 | 2 | 1 | 1 |
| Comparative Paper 2 | 3 | 3 | 3 |
| Comparative Paper 3 | 4-5 | 3 | 2-3 |
| MagnoStar 250 | ≧5 | 3 | 3 |

The following conclusions can be drawn:

Commercial dryer product Nuodex Web Mn9 with active component Mn— (2-ethylhexanoate) complex, as being specially developed for chemical drying of waterborne paint types, is also active for chemical drying if added to the ink.

Chemical drying time of MagnoStar, printed with Black Tempo Max ink 'as such' is significantly longer than of Paper 1 (factor >2.0) and of Paper 2 (factor >1.5) and somewhat longer than of Paper 3 (factor >1.0).

It appears that for all papers involved, except Paper 2, chemical ink drying time can be shortened significantly (up to 50% for Paper 1) by adding additional manganese dryer complex in the printing ink, as is general practice by printers in printing.

With respect to MagnoStar, its chemical ink drying time even with additional manganese dryer complex (0.1 wt.-% Mn) in printing ink can still not compete (factor 1.5 slower) with chemical ink drying time of Paper 1, printed with ink 'as such'. Similarly Magnostar chemical ink drying time under these conditions is equivalent to that of Paper 2 or even better than Paper 3, printed with ink as such.

Assuming that fast chemical ink drying behaviour is essential for good converting ability, it seems clear that special measures are to be involved to enhance converting ability of MagnoStar to 'best in class' competitor paper Paper 1. Remark: Paper 1 while showing excellent drying is very sensitive for picking (only 2× free versus 4× for MagnoStar) and for low print gloss.

Conclusions Part II, Incorporation of Mn— (2-ethylhexanoate) catalytic dryer complex in paper topcoat to enhance chemical ink drying performance Results of Thumb tests of printed Black Tempo Max ink on laboratory made uncalendered 'regular' 250 gsm MagnoStar with varying concentrations incorporated Mn— (2-ethylhexanoate) catalytic dryer complex in topcoat are summarized in Table 2:

TABLE 2

| Chemical ink drying time (h) via Thumb test | 0 wt.-% Mn in topcoat | 0.05 wt.-% Mn in topcoat | 0.1 wt.-% Mn in topcoat | 0.2 wt.-% Mn in topcoat |
|---|---|---|---|---|
| BTM ink printed on A substr. + topcoat | 4 | 3 | 2-3 | 2 |
| BTM ink printed on B substr. + topcoat | 3 | 2-3 | 2 | 1-2 |

The following conclusions can be drawn:

Chemical ink drying performance of laboratory made (uncalendered) 'regular' MagnoStar without any added manganese dryer complex is slightly faster than of commercial 250 gsm (calendered) MagnoStar (see Table 1).

In regular concentration range 0-0.2 wt.-% Mn chemical ink drying performance of laboratory made 'regular' MagnoStar was best improved from 4 h (blank) to 2 h (=50% residual drying time).

In case of laboratory made 'fast setting' Magnostar, applying a 'faster' middle coat layer of type B, in the same concentration range of 0-0.2 wt.-% Mn chemical ink drying performance was improved from 3 h (blank) to 1-2 h, in fact also an improvement in drying time of about 50%. Obviously applying a 'faster' middle coat layer B in absolute sense leads to 1 h improvement of chemical ink drying performance over the whole manganese concentration range concerned.

Conclusions Part III, Incorporation of Mn-(2-ethylhexanoate, bpy) catalytic dryer complex in paper topcoat to enhance chemical ink drying performance Results of Thumb tests of printed Black Tempo Max ink or Bio 2 ink on laboratory made 'regular' 250 gsm MagnoStar with varying concentrations incorporated Mn-(2-ethylhexanoate, bpy) catalytic dryer complex in topcoat are summarized in Table 3 {at 0.1 wt.-% Mn and varying ratio bpy/Mn} and in Table 4 {at 0.2 wt.-% Mn and varying ratio bpy/Mn}.

Figure 1:
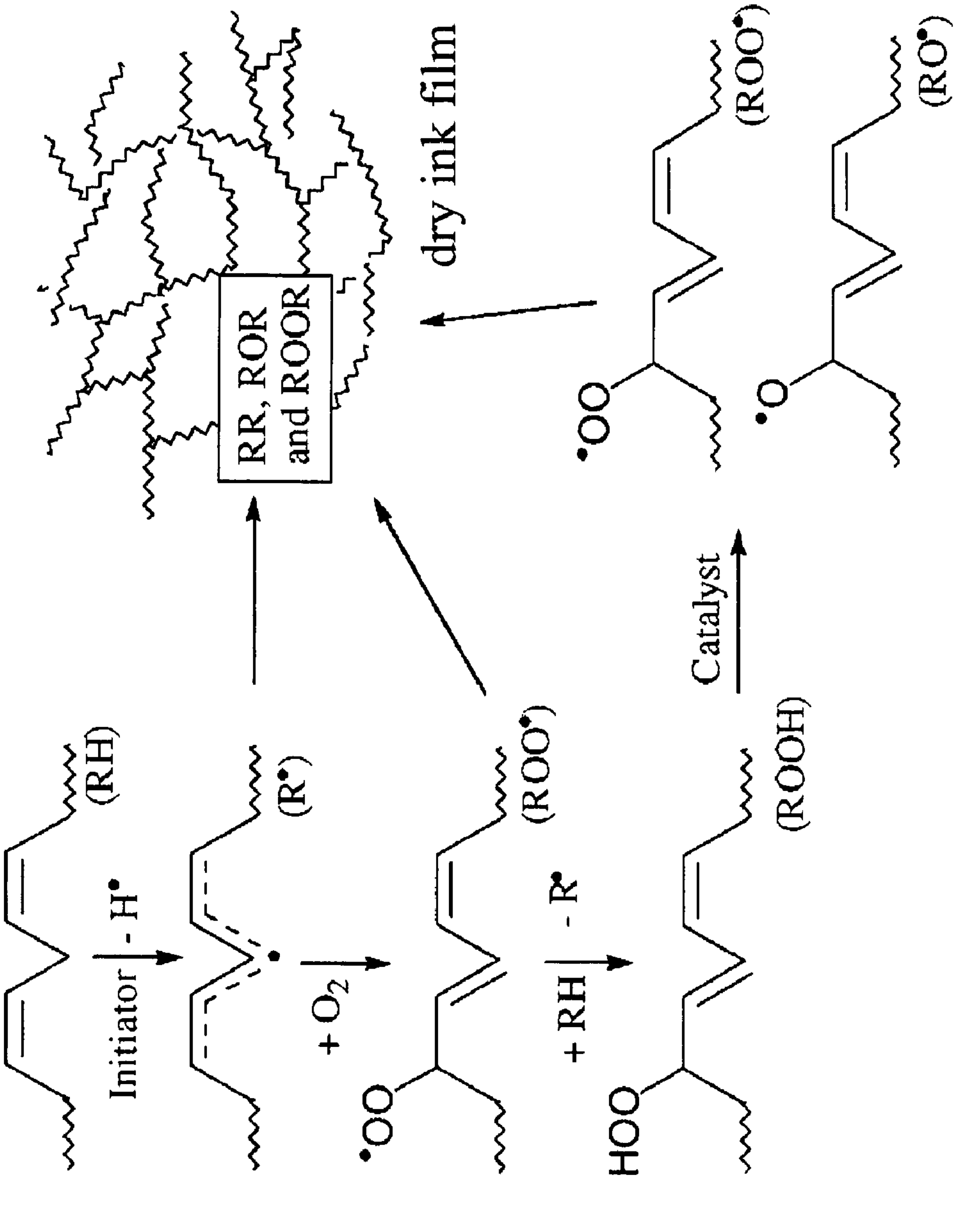
FIG. 1 shows a schematic illustration of the chemical processes of catalytic ink cross-linking.
Figure 2:
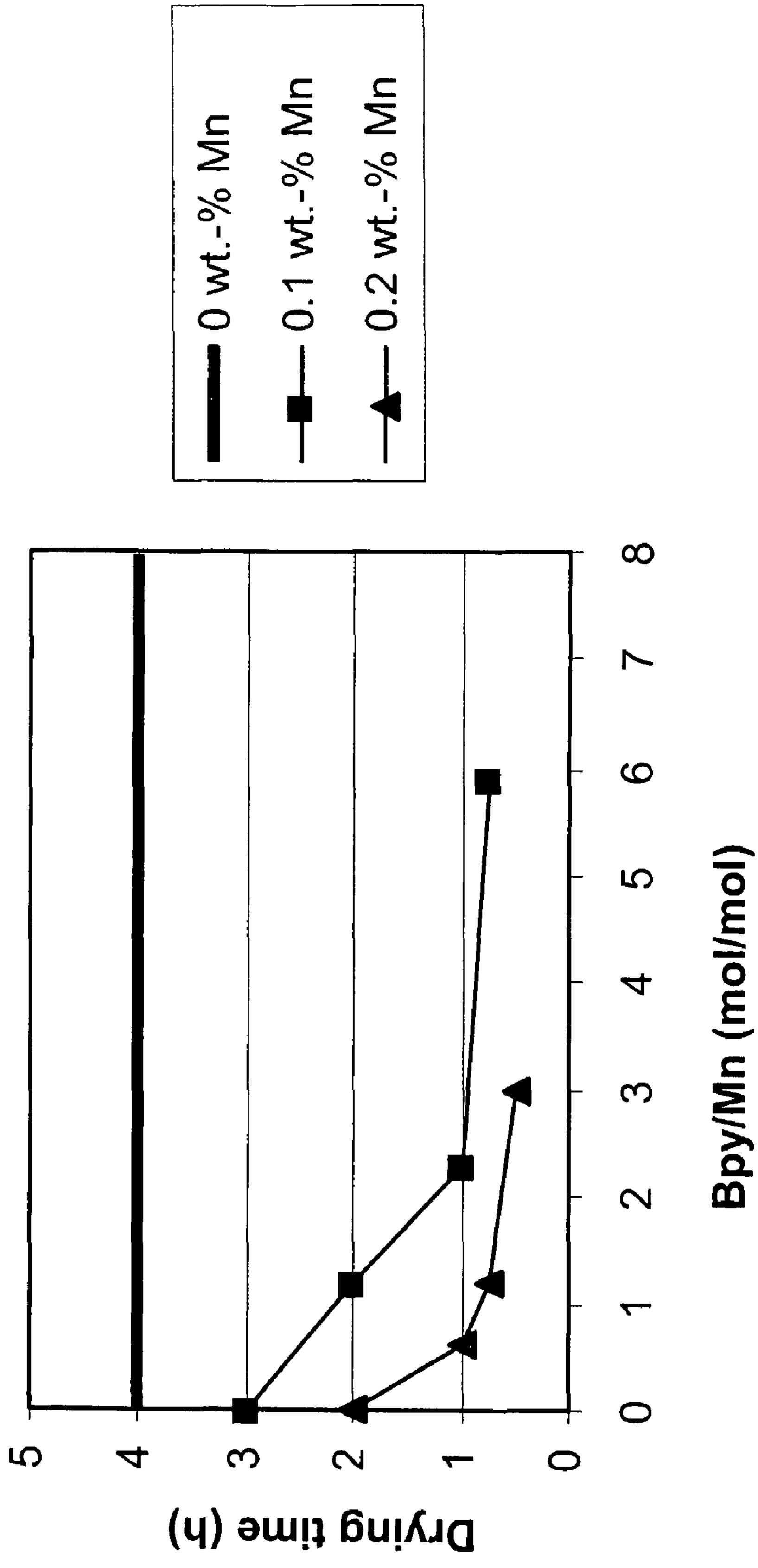
FIG. 2 shows the chemical ink drying performance as determined by thumb test of printed Black tempo max ink on laboratory made 'regular' MagnoStar with incorporated Mn-(2-ethylhexanoate, bpy) dryer complex in topcoat, given as a function of the molar ratio of ligand to metal for different contents in Mn (reference without Mn and at 0.1 and 0.2 wt.-% Mn)

In a graphical presentation these results are summarized in FIG. 2, which gives the chemical ink drying performance of printed Black tempo max ink on laboratory made 'regular' MagnoStar with incorporated Mn— (2-ethylhexanoate, bpy) dryer complex in topcoat as a function of the bpy content.

Figure 3:
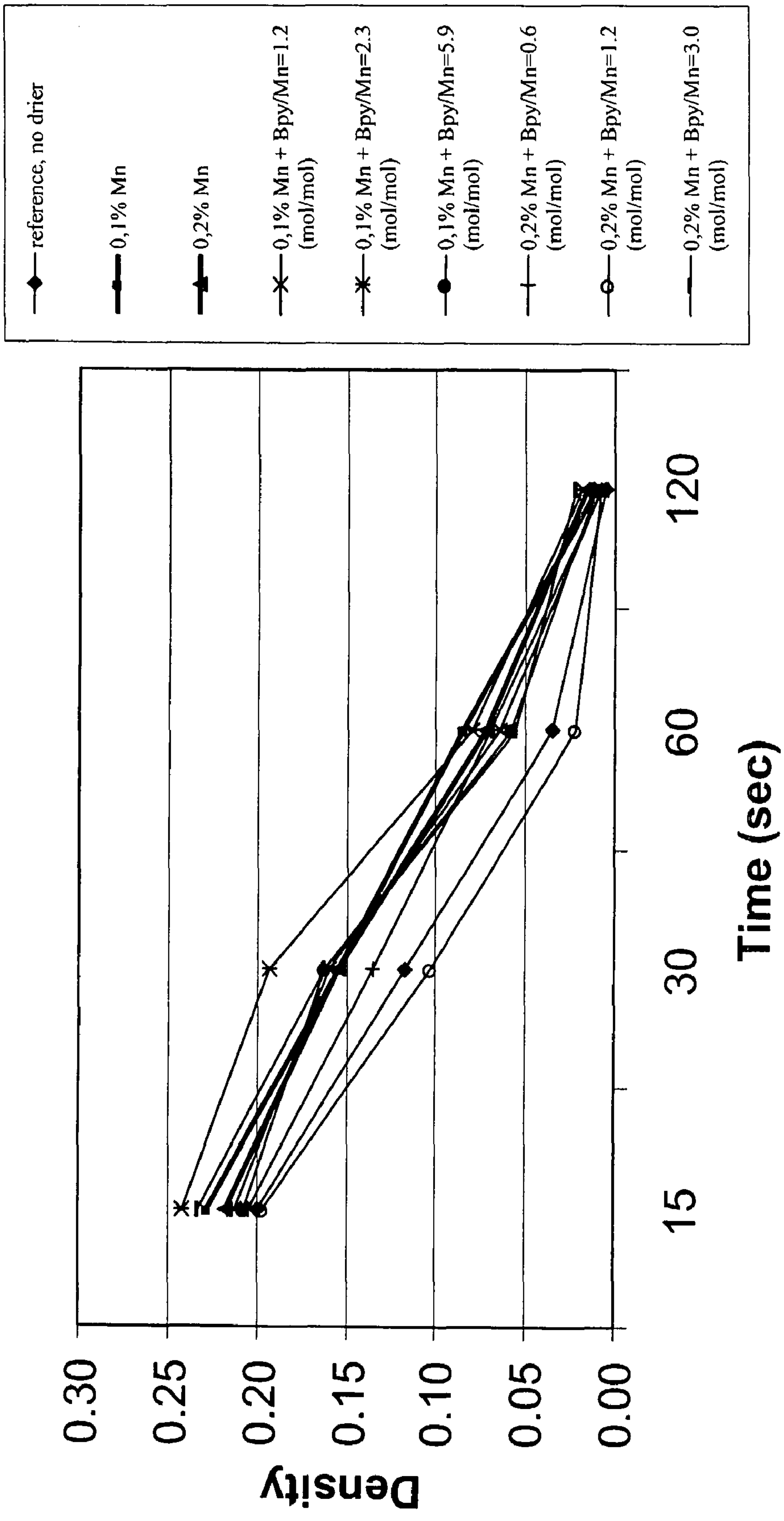
FIG. 3 shows a set-off test of 'regular' MagnoStar 250 gsm end paper with incorporated Mn-(2-ethylhexanoate, bpy) catalytic dryer complex, at 0.1 and 0.2 wt.-% Mn as a function of the molar ratio of ligand to metal i.e. with varying excess bpy, printed with Black tempo Max ink.

In FIG. 3 it was verified for all tested 'regular' MagnoStar papers with incorporated Mn-(2-ethylhexanoate, bpy) catalytic dryer complex in topcoat that regular set-off test results (=initial physical ink setting) are not significantly influenced by the presence of said dryer complexes. This is important for optimum printing performance under practical conditions, e.g. with respect to minimum fouling of printing press.

Chemical drying performance of printed Bio 2 ink at 0.1 wt.-% Mn was still further improved on co-addition of second ligand bpy from 6 h (blank) to only 0.5-1 h (=8.3-16.7% residual drying time), at molar ratio bpy/Mn=20.1. Similarly at higher concentration 0.2 wt.-% Mn and co-addition of second ligand bpy chemical ink drying performance of printed Bio 2 ink was further improved from 6 h (blank) to only 0.5-1 h (=8.3-16.7% residual drying time), at molar ratio bpy/Mn=3.0.

TABLE 3

| Chemical drying time (h) via Thumb test | 0 wt.-% Mn in topcoat | 0.1 wt.-% Mn in topcoat bpy/Mn = 0 (mol/mol) | 0.1 wt.-% Mn + 0.35 wt.-% bpy in topcoat bpy/Mn = 1.2 (mol/mol) | 0.1 wt.-% Mn + 0.66 wt.-% bpy in topcoat bpy/Mn = 2.3 (mol/mol) | 0.1 wt.-% Mn + 1.68 wt.-% bpy in topcoat bpy/Mn = 5.9 (mol/mol) | 0.1 wt.-% Mn + 2.33 wt.-% bpy in topcoat bpy/Mn = 8.2 (mol/mol) | 0.1 wt.-% Mn + 5.72 wt.-% bpy bpy/Mn = 20.1 (mol/mol) |
|---|---|---|---|---|---|---|---|
| BTM ink printed on A substr. + topcoat | 4 | 2-3 | 2 | 1 | 0.5-1 | — | — |
| Bio 2 ink printed on A substr. + topcoat | 6 | 4 | 3 | 2 | 1-2 | 1 | 0.5-1 |

TABLE 4

| Chemical drying time (h) via Thumb test | 0 wt.-% Mn in topcoat | 0.2 wt.-% Mn in topcoat bpy/Mn = 0 (mol/mol) | 0.2 wt.-% Mn + 0.35 wt.-% bpy in topcoat bpy/Mn = 0.6 (mol/mol) | 0.2 wt.-% Mn + 0.66 wt.-% bpy in topcoat bpy/Mn = 1.2 (mol/mol) | 0.2 wt.-% Mn + 1.68 wt.-% bpy in topcoat bpy/Mn = 3.0 (mol/mol) |
|---|---|---|---|---|---|
| BTM ink printed on A substr. + topcoat | 3-4 | 1-2 | 1 | 0.5-1 | 0.5 |
| Bio 2 ink printed on A substr. + topcoat | 6 | 3 | 2 | 1-2 | 0.5-1 |

The following conclusions can be drawn:

Chemical drying performance of printed Black Tempo Max at 0.1 wt.-% Mn was still further improved on co-addition of second ligand bpy from again 4 h (blank) to only 0.5-1 h (=12.5-25% residual drying time), at molar ratio bpy/Mn=5.9. Similarly at higher concentration 0.2 wt.-% Mn and co-addition of second ligand bpy chemical ink drying performance of printed Black Tempo Max was further improved from 3-4 h (blank) to only 0.5 h (=12.5-16.7% residual drying time), at molar ratio bpy/Mn=3.0.

Figure 4:
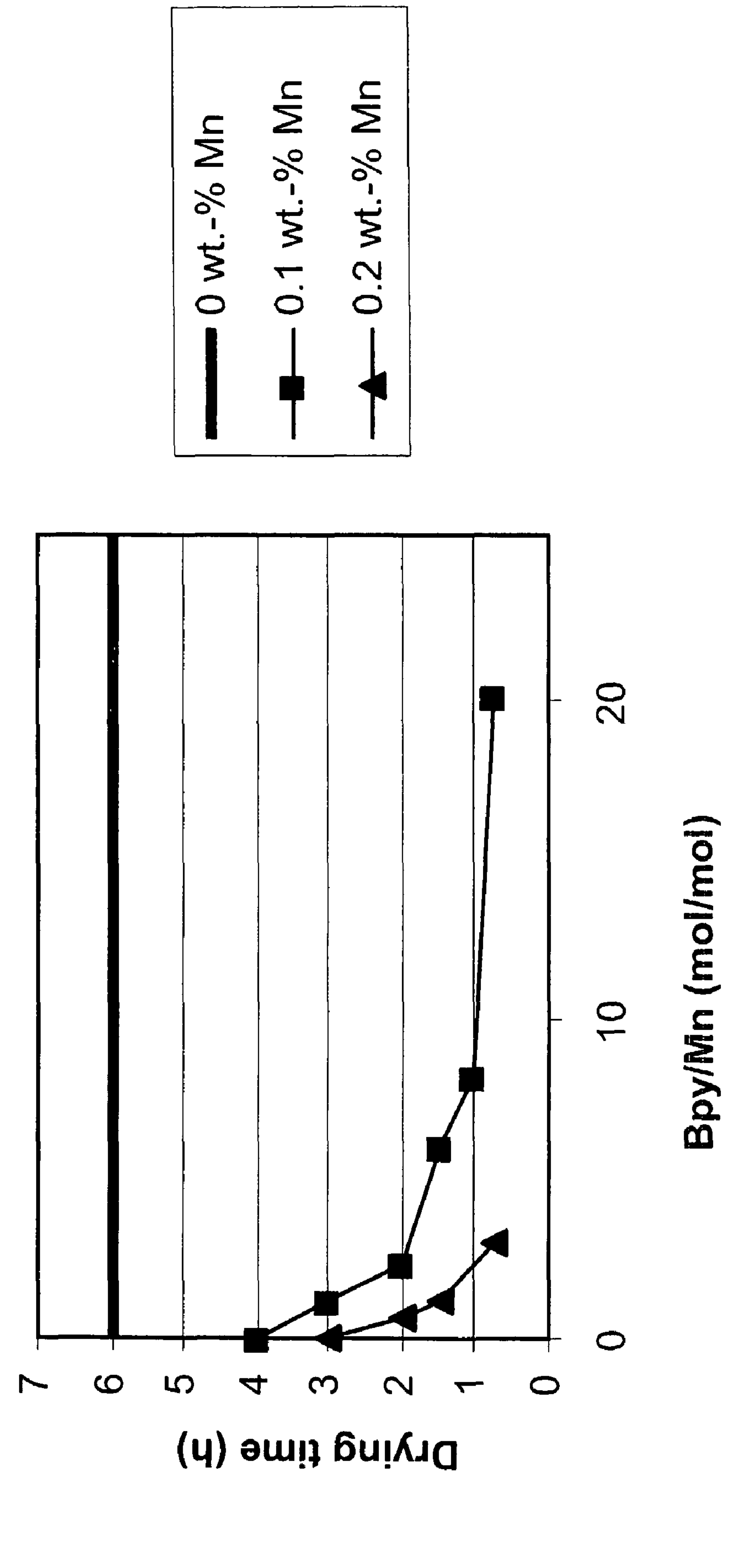
FIG. 4 shows the chemical ink drying performance as determined by thumb test of printed Bio 2 ink on laboratory made 'regular' MagnoStar with incorporated Mn-(2-ethylhexanoate, bpy) dryer complex in topcoat, given as a function of the molar ratio of ligand to metal for different contents in Mn (reference without Mn and at 0.1 and 0.2 wt.-% Mn)

In a graphical representation these results are summarized in FIG. 4, which gives the chemical ink drying performance of printed Bio 2 ink on laboratory made 'regular' MagnoStar with incorporated Mn— (2-ethylhexanoate, bpy) dryer complex in topcoat.

Conclusions

The Mn— (2-ethylhexanoate) catalytic dryer complex for waterborne paint systems is also active for chemical drying of printed ink layer on WFC sheet-fed paper if incorporated in the coating.

Chemical ink drying time of MagnoStar even with additional manganese dryer complex in printing ink (a regular 'trick' in printing practice) can still not compete (factor 1.5 slower) with chemical ink drying time of other papers, printed with ink 'as such'.

In regular concentration range 0-0.2 wt.-% Mn incorporated in top coat chemical ink drying performance of laboratory made 'regular' MagnoStar was best improved from 4 h (blank) to 2 h (=50% residual drying time).

Chemical drying performance of printed Black Tempo Max at 0.1 wt.-% Mn incorporated in top coat was still further improved on co-addition of second ligand bpy from again 4 h (blank) to only 0.5-1 h (=12.5-25% residual drying time), at molar ratio bpy/Mn=5.9. Similarly at higher concentration 0.2 wt.-% Mn and co-addition of second ligand bpy chemical ink drying performance of printed Black Tempo Max was further improved from 3-4 h (blank) to only 0.5 h (=12.5-16.7% residual drying time), at molar ratio bpy/Mn=3.0.

Chemical drying performance of printed Bio 2 ink at 0.1 wt.-% Mn incorporated in top coat was still further improved on co-addition of second ligand bpy from 6 h (blank) to only 0.5-1 h (=8.3-16.7% residual drying time), at molar ratio bpy/Mn=20.1. Similarly at higher concentration 0.2 wt.-% Mn and co-addition of second ligand bpy chemical ink drying performance of printed Bio 2 ink was further improved from 6 h (blank) to only 0.5-1 h (=8.3-16.7% residual drying time), at molar ratio bpy/Mn=3.0.

Part IV: Further Experimental Results

A further more detailed analysis was carried out in order to assess the possibility of using chemical drying aids in the coatings in combination with silica gel as a pigment and in order to test the possibility of using the papers according to the present invention without having to use anti-set-off powder and/or infrared drying and/or overprint varnish.

Anti Set-off Powders are blends of pure food starches with anti-caking and flow agents added and are available in a wide range of particle sizes (~15 to ~70 μm). The starch can be tapioca, wheat, maize, or potato. When sprinkled over the printed surface, it prevents the front or printed side of a substrate from intimately contacting the back or unprinted side of a substrate. The starch particles act as spacers so air can enter from the sides and between the front and back of the substrate. This free flow of air across the inked surface allows inks that "dry" or cure by surface oxidation and cross-linking to receive exposure to oxygen in the air. The ink then cures to its final oxidized and cross-linked state.

Offset powder obviously plays a very important role in a converting application that uses inks requiring oxidation/cross-linking to reach their final properties. Although offset powders are very beneficial, they can contribute detrimental characteristics. In applications in which a printed substrate is subject to further converting when perfect surface appearance is a requirement, use of offset powders may not be appropriate. E.g. in case of a printed substrate that will undergo lamination with an adhesive to a clear film. The application may be a label on which gloss and an optically perfect appearance are necessary. The dusting of offset powder acts like a sprinkling of dirt or other contaminant: It will produce surface imperfections in the laminate and seriously detract from the final appearance. They become entrapped in the lamination and contribute a "hills-and-valleys" appearance. This may be on a very small scale, but it is often enough to lead to an unsatisfactory appearance on close inspection. Another application in which the use of offset powder may not be appropriate is on a printed substrate used to make labels for the in-mould label process. In this process, a label printed on a paper or plastic substrate becomes an integral part of an injection- or blow-moulded container during the moulding operation. For the popular "no-label" look, the optical characteristics must be such that the consumer cannot see the label under any circumstances. Specks of offset powder, dust, or anything similar would detract from the appearance of such a label and make it unsatisfactory.

On a conventional woodfree paper-coatings were applied with formulations as given in the subsequent tables, wherein the substrate was coated on both sides with a precoat layer in a coat weight of 11 gsm, and a top coat layer of also 11 gsm.

The formulations of the precoat layers as investigated are given in table 5, and the formulations of the top coat layers and how they are combined with the precoat layers is given in table 6:

TABLE 5

Formulations of precoatings

| | | pre-coat: | | | | | | |
|---|---|---|---|---|---|---|---|---|
| | solids [%] | V6 | V7 | V8 = V6 | V9 = V6 | V10 = V6 | V11 = V6 | V12 = V7 |
| HC 60 M HH | 78 | | 43 | | | | | 43 |
| HC 90 | 75 | | 45 | | | | | 45 |
| HC 95 M HH | 78 | 100 | | 100 | 100 | 100 | 100 | |
| Pigment Syloid C803 | 99.4 | | 12 | | | | | 12 |
| Binders/additives | | | | | | | | |
| Latex | 50 | 9 | 11.5 | 9 | 9 | 9 | 9 | 11.5 |
| PVOH | 22 | 0.3 | 0.3 | 0.3 | 0.3 | 0.3 | 0.3 | 0.3 |
| Polysalz S | 40 | | 0.1 | | | | | 0.1 |

TABLE 6

Formulations of top coat, wherein SFC stands for a steep fine carbonate pigment with a specific surface area of 18 $m^2/g$

| | | IID_6 | IID_7 | IID_8 | IID_9 | IID_10 | IID_11 | IID_12 |
|---|---|---|---|---|---|---|---|---|
| | | Pre-coat: | | | | | | |
| | | V10 | V12 | V8 | V9 | V6 | V11 | V7 |
| | | top coat | | | | | | |
| | solid [%] | D6 | D7 | D8 | D9 | D10 | D11 | D12 = D6 |
| HC 60 M HH | 78 | 3 | 3 | | | | | 3 |
| HC 90 | 75 | 15 | 15 | | | | | 15 |
| HC 95 M HH | 78 | | | | | | | |
| SFC | 72 | 72 | 72 | 77 | 73 | 70 | 77 | 72 |
| Amazon 88 | 74 | 10 | 10 | 15 | 15 | 15 | 15 | 10 |
| Pigment Syloid C803 | 99.4 | | | 8 | 12 | 15 | 8 | |
| Latex Acronal | 50 | 8.0 | 8.0 | 10.0 | 10.0 | 10.0 | 10.0 | 8.0 |
| Latex | 50 | 1.0 | 1.0 | 1.0 | 1.0 | 1.0 | 1.0 | 1.0 |
| PVOH | 22 | 0.5 | 0.5 | 0.5 | 0.5 | 0.5 | 0.5 | 0.5 |
| Polysalz S | 40 | 0.1 | 0.1 | 0.1 | 0.1 | 0.1 | 0.1 | 0.1 |
| Manganese Acetate | 100 | 1.5 | | | | | 1.5 | 1.5 |

All coatings have good runnability without scratches and there is a high glossability of the papers—paper gloss level (55% DIN 75°) was reached with 200 kN/m nip load.

The higher the silica amount used in top coating, normally the lower the paper gloss. Addition of manganese acetate has no significant influence on paper gloss. Use of silica in pre-coating leads to slightly lower paper gloss of top coated paper (before calendering).

Preferentially Mn(II) acetate is used because of many advantages above other catalyst systems, and it has to be pointed out that the use of such manganese complexes is, as already pointed out above, is not limited to the present coatings but can be extended to any other coating. The manganese acetate system is characterised by no smell, a lower price, more easily water soluble salt, smaller effect on brightness/shade, no environmental/health issues. As a matter of fact for full catalytic activity of such a system, it seems to be advantageous to have Mn(II) as well as Mn(II) in the coating (top coating or second coating beneath the top coating) at the same time. Optimum activity is achieved if Mn(II) and at least some Mn(III) acetate is present. One advantageous way to intrinsically introduce necessary Mn(III) acetate next to I-form at the same time creating a minimum amount of generally brownish and in fact rather water insoluble Mn(III) form is possible as follows:

a) addition of additional 0.1 pph Polysalz, in order to keep Mn-ions fully available as free catalytic species. It is suspected that if this constituent is not added, then most probably high valency Mn-ions will strongly interfere or even be bounded with calcium carbonate dispersions in coating, and will destabilise/coagulate them via interaction with double layers, so also coat quality is decreased, b) Mn(acetate) is slowly added as last component to top-coat composition, where it is preferred to start with most pH=8.5-9. Higher pH up to 10 is possible and the result (some Mn(III)) is only satisfactory but the dissolving behaviour of Mn(acetate) is then better/quicker, c) after dissolving Mn(acetate) (as visually judged) it is also preferred to again adjust pH up to approximately 8.5 (pH generally goes down when dissolving acid reacting Mn(acetate)), d) Finally it seems to be beneficial to have additional mixing time (typically 30 minutes in present praxis) to fully dissolve Mn(acetate) to molecular level to have it all available for catalytic cycle.

Mn(acetate) is preferably present 0.1-0.6% Manganese (=II+III) in weight of the total dry weight of a top coating. Most preferred is the presence of 0.2-0.4%. It has to be noted that other Mn-salts/complexes are also possible, like Mn(II) acac. The sole catalytic activity of Mn(acetate) can be enhanced and/or supported via different measures: A) combination with secondary driers and/or auxiliary driers, B) combination with responsible ligands, so e.g. combined with bpy the activity is very high and almost equal to a system like Nuodex Web Mn9/bpy, so combined with other ligands activity can be significantly increased to attractive level, C) addition of systems like Li(acac), D) addition of peroxides (in properly stabilized but available form) to have necessary oxygen direct at spot without diffusional limitations.

As one can see from FIGS. 5 and 6, showing the white gas test and the wet ink rub test results, respectively, paper IID_7 with reference top coating and silica in pre-coating shows slowest chemical drying tendency in laboratory. With silica in top coating it is possible to reach chemical drying times of 3 or 2 hours (for higher silica amounts). Paper IID_11: use of manganese acetate in combination with 8% silica led to a further improvement 2 hours (instead of 3 hours). In this case also the dot (more critical than tail) on tested paper is dry between 3 to 4 hours. Use of silica leads to improved wet ink rub behaviour (ESTM 2303) and improved ink scuff resistance (GTM 2312-1). Addition of manganese acetate or silica in pre-coating leads to further improvements.

For the sake of completeness, a definition of the test used shall be given here:

White Gas Test (ESTM 2310):

The white gas test is used to evaluate the time needed for a sheet fed offset ink film printed on a paper to be chemically dry.

Definitions: Chemical ink drying: partial to full cross-linking of unsaturated vegetable oils of the ink via oxidative polymerisation/auto-polymerisation.

Principle: A sample is printed with a standard commercial ink on the Prüfbau printing device. After several time intervals, a part of the printed sample is put in contact with white gas. The white gas can dissolve the ink film on the paper as long as the ink film is not totally cross-linked. When the white gas does not dissolve the ink film anymore, the sample is considered chemically dry.

Device: Prüfbau printing device; Aluminium Prüfbau reel 40 mm; Prüfbau sample carrier; Tempo Max Black (SICPA); FOGRA-ACET device.

Sampling and test piece preparation: For the white gas test, cut a piece of the strip of at least 5 cm length. Then: 1. Adjust the pressure of the printing nip of the Prüfbau printing device to 800N; 2. Adjust the printing speed to 0.5 m/s; 3. Weigh the ink with a tolerance of 0.005 g and apply the amount of ink on the inking part of the Prüfbau printing device; 4. Distribute the ink for 30 s; 5. Fix the test piece on the sample carrier; 6. Place the aluminium Prüfbau reel on the inking part and take off ink for 30 s; 7. Put the inked aluminium Prüfbau reel on the right print unit; 8. Put the sample carrier against the inked aluminium reel and switch the printing speed on; 9. Switch the printing speed off; 10. Mark the time of printing (e.g.: starting time for the white gas test); 11. Choose the thickness card that corresponds to the paper's grammage; 12. Cut a piece of the strip of at least 5 cm length; 13. Stick the extremity of the strip to the thickness card with tape; 14. Place a felt pad in the pad holder of the FOGRA-ACET device; 15. Pump 0.5 ml white gas with the all glass syringe and apply it on the felt pad; 16. Place the thickness card with the sample to be tested in the card holder; 17. Close the FOGRA-ACET device and immediately pull the thickness card with the test sample attached to it out of the device; 18. Evaluate the chemical drying of the sample; 19. Repeat the operation every hour until the sample is fully dry (no dissolving of the ink layer visible.

Calculations: The chemical drying time of a printed ink film is the time at which the ink on the sample tested could not be dissolved. The chemical drying time is given in hours.

Wet Ink Rub Test (ESTM 2303):

Scope: The method describes the evaluation of the rub resistance of papers and boards at several time intervals after printing, before full drying. Normative References/Relating International Standards: GTM 1001: Sampling; GTM 1002: Standard Atmosphere for Conditioning; ESTM 2300: Prüfbau printing device-description and procedure. Relating test methods descriptions: Prüfbau manual.

Definitions:

- Ink-rub: when submitted to mechanical stress like shear or abrasion, ink layers can be damaged and cause markings on the printed products, even if they are fully dried.
- Chemical drying: in sheet fed offset, the hardening of the ink film via reactions of polymerisation.
- Wet ink rub value: measurement of the amount of ink that has marked the counter paper during the wet ink rub test at a given time after printing.

Principle: A test piece is printed with commercial ink at the Prüfbau printing device. After several time intervals, a part of the printed test piece is rubbed 5 times against a blank paper (same paper). The damaging of the print and the markings on the blank paper are evaluated and plotted against a time scale. Printing ink Tempo Max black (SICPA, CH) is used.

Laboratory procedure: 1. Adjust the printing pressure to 800N, 2. Weigh the ink with a tolerance of 0.01 g and apply the amount of ink on the inking part of the Prüfbau printing device, 3. Distribute the ink for 30 s, (the ink distribution time can be lengthened to 60 s for easier manipulation), 4. Fix the test piece on the short sample carrier, 5. Place the aluminium Prüfbau reel on the inking part and take off ink for 30 s, 6. Weigh the inked reel ($m_1$), 7. Put the inked aluminium Prüfbau reel on a print unit, 8. Put the sample plate against the inked aluminium reel, print the test piece at 0.5 m/s, 9. Mark the time at which the sample as been printed, 10. After printing, weigh again the inked reel ($m_2$) and determine the ink transfer $I_t$ in g (Note: the ink transfer $I_t$ is given by $I_t=m_1-m_2$ where $m_1$ is the weight of the inked reel before printing and $m_2$ the weight of the same reel after printing), 11. Adjust the number of rubbing on the Prüfbau ink rub resistance tester to 5, 12. Cut a round piece in the printed strip with the Prüfbau piece cutter. 13. Stick the test piece against one of the Prüfbau test piece carrier, and fix a blank strip of the same paper on the paper carrier, 14. After a defined time interval after printing, place the blank paper and the printed round piece face to face on the Prüfbau device and start the rubbing (five times), 15. Recommence the operation for all defined time intervals after printing and then, evaluate the papers drying as a function of the density of markings on the blank paper/damaging of the printed paper.

The chart below provides an example for the amount of ink to be weighed for the printing and the times after printing at which the ink rub test can be performed:

| Grades | Ink amount | Rubbing times (min.) |
|---|---|---|
| Gloss | 0.30 g | 15/30/60/120/480 |
| Silk/Matt | 0.30 g | 30/60/240/360/480 |

Results evaluation: The results are both measured and evaluated visually. Visual evaluation: order all the tested blank samples from best to worse as a function of the amount of ink that has marked the blank paper. Measurement: with the Colour Touch device, measure the colour spectrum of the blank samples (light source UV excluded). Measure the colour spectrum of the untested white paper. The colour spectra of the tested samples have a peak of absorption at a defined wavelength, which is typical for the ink used (this is the colour of the ink). The difference of the reflectance factors at this wavelength between the tested sample and the white untested sample is an indication of the ink rub. With the SICPA Tempo Max Black, the peak wavelength is 575 nm and $$\text{Ink rub}=(R_{sample}-R_{blank})575\text{ nm}$$

As one can see from FIGS. 7 to 9, slowest ink setting is observed for paper IID_7 with silica in pre-coating and reference top coating without silica or manganese acetate. An increased silica amount in top coating leads to faster initial ink setting behaviour. Use of silica in pre-coating results in a slightly faster set-off compared to pre-coating without silica. Short time as well as long time ink setting values are extremely small. Offset suitability (dry) as well as multi colour fibre picking level of all papers is rather low (offset suitability in most cases 0— best valued for paper IID_7).

The specific chemical drying aid used in these experiments is Manganese acetate comprising $Mn(II)(Ac)_2.4H_2O$ and $Mn(III)(Ac)_3$. It should be noted that this specific transition metal complex is a highly efficient chemical drying aid, and, while it shows synergistic effect in combination with silica, it is a generally useful chemical drying aid for use in top coatings or in precoatings.

Printing Properties:

Papers tested (all 135 g/m$^2$): commercial test paper (CTP); D6; D7, D8, D9, D10; D11; D12 (all as given above).

Printing conditions: Printer: Grafi-Media (Zwalmen, NI); Press: Ryobi 5 colours; Inks in order of colour sequence:

Sicpa Tempo Max B, C, M, Y; Printing speed: 11.000 sheets/h; anti-set-off powder: yes/no; Infra Red dryers: no.

Tests performed: Folding: cross fold (1 buckle, 1 knife, no creasing); Wet ink rub; White gas test; Blocking test (no anti-set-off powder). Testing times: ½ hour, 1 hour, 2 hours, 3 hours, 4 hours, 24 hours, >48 hours.

Results Blocking Test:

| | |
|---|---|
| D6 | Slight markings in 300% area |
| D7 | Very slight markings (better than D6) |
| D8 | Very slight markings in 300% area (~ D6) |
| D9 | No markings |
| D10 | No markings |
| D11 | Very slight markings in 300% area (a bit more than D6, but less than CTP) |
| D12 | Slight markings in 300% area (a bit more than D6, but less than CTP) |
| CTP | Markings |
| D8 with powder | No markings |
| D11 with powder | No markings |
| CTP with powder | No markings |

No paper presents blocking. The papers printed with anti-set-off powder do not present any markings. The paper with the most markings is CTP. D9 and D10 (and also D8 and D11 to a slightly lesser extent) do not present any markings: they are printable without anti-set-off powder.

Results Folding Test:

The folding test has been done on a buckle folder. Contrarily to printer Haletra, there is no creasing module for the second fold, so that the folding is a bit less critical. The folding test is evaluated with help of a mark from 0 (no markings visible) to 5 (very strong markings). The results of the folding taste are summarised in table 7.

TABLE 7

Results of the folding test

| Paper | ½ hr | 1 hr | 2 hr | 3 hr | 4 hr | ∞ |
|---|---|---|---|---|---|---|
| D6 | 1.00 | 1.25 | 1.00 | 1.00 | 1.00 | 0.25 |
| D7 | 0.75 | 0.75 | 0.75 | 0.75 | 0.75 | 0.75 |
| D8 | 0.25 | 0.25 | 0.25 | 0.25 | 0.25 | 0.25 |
| D9 | 0.50 | 0.50 | 0.50 | 0.50 | 0.50 | 0.50 |
| D10 | 0.75 | 0.75 | 0.75 | 0.75 | 0.75 | 0.75 |
| D11 | 0.75 | 0.75 | 0.75 | 0.75 | 0.75 | 0.75 |
| D12 | 1.00 | 1.00 | 1.00 | 1.00 | 1.00 | 0.75 |
| CTP | 1.00 | 1.00 | 1.00 | 1.00 | 1.00 | 0.75 |
| D8 with powder | 0.25 | 0.25 | 0.25 | 0.25 | 0.25 | 0.25 |
| D11 with powder | 0.75 | 0.75 | 0.75 | 0.75 | 0.75 | 0.75 |
| CTP with powder | 0.25 | 0.25 | 0.25 | 0.25 | 0.25 | 0.25 |

The general level of markings at the fold has been evaluated by a group of experts (printers) as very good. There is little to no difference in the markings between ½ hour and ∞ (=a week), which would imply that the chemical drying has small effect on the folding test. There are only small differences between the papers.

Results Wet Ink Rub:

The wet ink rub test has been performed on the printed sheets, on the 300% area B, C, M. The results of this test are summarised graphically in FIG. 10. All papers show a very good level of wet ink rub in general.

The best paper is D11, followed by D7, D8, then D9 and D10, D6, D12 and CTP have similar levels of markings.

Results White Gas Test:

The white gas test has been performed on the printed sheets, on the 300% area B, C, M. The results are summarised in table 8.

TABLE 8

White gas test results

| Paper | White gas drying time (hr) |
|---|---|
| D6 | 4 < t < 24 |
| D7 | 3 |
| D8 | ≧4 |
| D9 | ½ |
| D10 | ½ |
| D11 | 3 |
| D12 | ≧4 |
| CTP | 4 < t < 24 |
| D8 with anti set-off powder | ≧4 |
| D11 with anti set-off powder | 3 |
| CTP with anti set-off powder | 4 < t < 24 |

The fastest papers are D9 and D10, which are dry after ½ hour. The slowest paper is CTP, followed by D6.

The following conclusions can be drawn from this experimental part:

D9 and D10 are printable without any anti-set-off powder.

D7, and also D11 are also printable without anti-set-off powder (only slight markings on critical areas)

For the wet ink rub test, the levels are very good, but D11, followed by D7 and D8 showed the best results.

Another approach is chemical or physical immobilisation of drier systems. It is possible to chemically immobilise the catalytic drier systems as described above at the huge inner pore surface of silica and especially silicagel like Syloid C803. In fact a suitable organic siloxane compound can be chemically anchored to the hydroxyl-groups at the silica surface, then a ligand like SB2 can be chemically reacted with this anchored siloxane compound and finally the primary metal drier salt or complex (e.g. [Mn(acac)$_3$] or [Mn-acetate]) can be linked to this anchored ligand via coordinative bound.

Advantages e.g.:

Eventual toxic properties of drier complex less pressing

Eventual discolouration better to fully suppressed

Possibly less deactivation of drier in presence of Fount solution (at commercial printing process Another approach is to physically absorb the liquid drier system into the huge inner pore system of silica's or other minerals. Due to existing high capillary forces their behaviour as so-called Supported Liquid Phase Catalyst (SLPC) can even be equivalent to and as active as the above chemically immobilised variant, but significantly cheaper.

It is to be noted that all the examples given shall only be taken as illustrative examples and shall not be used to limit the scope as defined in the appended claims.

The invention claimed is:

1. An ink receiving coating for an offset paper comprising:

a catalyst system operative to fix polymerisable or crosslinkable constituents of offset ink to be applied thereto, wherein the catalyst system comprises a transition metal complex, wherein a transition metal in the transition metal complex is selected from the group consisting of V, Mn, Fe, Co, Ni, Cu, Ce and mixtures thereof, and wherein the transition metal complex comprises at least one charged ligand selected from the group consisting of carboxylate and naphthenate and at least one neutral bidentate ligand and mixtures thereof, and wherein at least a fraction of a pigment part, is a fine particulate silica gel and comprises or is selectively enriched in transition metal complexes, wherein at least one transition metal complex is present in the silica and/or the other pigments in more than 10 ppb.

2. An ink receiving coating for an offset paper comprising:

a catalyst system operative to fix polymerisable or crosslinkable constituents of offset ink to be applied thereto, wherein the catalyst system comprises a transition metal complex, wherein a transition metal in the transition metal complex is selected from the group consisting of V, Mn, Fe, Co, Ni, Cu, Ce and mixtures thereof, and wherein the transition metal complex comprises at least one charged ligand selected from the group consisting of carboxylate and naphthenate and at least one neutral bidentate ligand and mixtures thereof and wherein a top coat and a second layer comprises a catalyst system in the form of a manganese complex, a manganese carboxylate complex and/or a manganese acetate or acetylacetate complex, wherein for catalytic activity of Mn complexes Mn(II) as well as Mn(III) are present concomitantly, or a mixture thereof, wherein the metal part of the catalyst system is present in the coating in 0.05-0.6 weight-% of the total dry weight of the coating.

3. The coating according to claim 1 or 2, wherein the catalyst system catalyzes an oxidative polymerisation or a crosslinking of unsaturated constituents of offset ink printed onto the coating.

4. The coating according to claim 1 or 2, wherein the catalyst system fixes fatty acid and resin parts of the offset ink.

5. The coating according to claim 1 or 2, wherein the catalyst system is water soluble or water dispersible.

6. The coating according to claim 1, wherein the transition metal in the transition metal complex is selected from the group consisting of V, Mn, Fe, Co and mixtures thereof.

7. The coating according to claim 1 or 2, wherein the transition metal complex is a primary drier catalyst system that is present together with a secondary drier catalyst system comprising Pb, Bi, Ba, Al, Sr, Zr or a mixture thereof in ionic form as salts or complexes.

8. The coating according to claim 7, wherein the transition metal complex primary drier catalyst system is present together with an auxiliary drier catalyst system comprising Ca, Zn, Li, K or a mixture thereof in ionic form as salts, carboxylates or complexes.

9. The coating according to claim 1 or 2, wherein the transition metal complex is at least one of a carboxylate and a naphthenate complex.

10. The coating according to claim 9, wherein the transition metal complex is a carboxylate with an alkyl chain of 6-12 carbon atoms, which may be unsubstituted or substituted.

11. The coating according to claim 10, wherein the transition metal complex is a 2-ethylhexanoate-complex/salt.

12. The coating according to claim 1 or 2, wherein the neutral bidentate ligand is a diamine.

13. The coating according to claim 1 or 2, wherein at least one neutral bidentate ligand is selected from the group consisting of 2,2'-bipyridine, 2-aminomethylpyridine, 2-hydroxymethylpyridine, 1,10-phenanthroline, and mixtures thereof.

14. The coating according to claim 13, wherein the ligands are substituted in order to increase solubility and/or dispersibility and/or stability.

15. The coating according to claim 1 or 2, wherein the catalyst system comprises Mn 2,2'-bipyridine.

16. The coating according to claim 1 or 2, wherein the catalyst system comprises a metal part and wherein the transition metal complex of the primary catalyst system is present in the coating in 0.01-0.5 weight-% of the total dry weight of the coating.

17. The coating according to claim 1 or 2 wherein the catalyst system comprises a transition metal as well as at least one bidentate ligand and wherein the molar ratio of metal to bidentate ligand is in the range of 1:1-1:8.

18. The coating according to claim 1 or 2, wherein additives for increasing the solubility/dispersibility of the transition metal complex and/or the ligand comprised in the catalyst system are present.

19. The coating according to claim 1 or 2, wherein the coating has a gloss on the surface of more than 75% according to TAPPI 75 deg.

20. The coating according to claim 1 or 2, wherein the coating has a gloss of more than 45 according to DIN 75 deg.

21. The coating according claim 1 or 2, wherein the coating of the offset paper comprises 100 parts in dry weight of pigment supplemented by 5-20 parts binder and additives, wherein the pigment part comprises ultra fine $CaCO_3$, or clay or a mixture thereof, and wherein the pigment part may be substituted up to 10-20 parts by a solid or vacuolated synthetic polymer pigment.

22. The coating according to claim 1 or 2, wherein the coating of the offset paper is applied as the top coat with a dried solid base weight in the range of 10-30 $g/m^2$.

23. The coating according to claim 1 or 2, wherein the drying time of offset printing ink applied to the coating is below 2 h.

24. The coating according to claim 1, wherein Co, Mn, V, Ce, Fe, Cr, Ni, Rh, Ru, or combinations thereof, are present in the pigment in more than 10 ppb up to 10 ppm, possibly in combination with Zr, La, Nd, Al, Bi, Sr, Pb, Ba or combinations thereof, in combination with Ca, K, Li, Zn and combinations thereof.

25. The coating according to claim 24, wherein a combination selected from Co and Mn, Co and Ca and one selected of Zr or La or Bi or Nd, Co and Zr or Ca, Co and La, Mn and K and/or Zr is present.

26. The coating according to claim 1 or 2, wherein the coating comprises a top coat and/or a second layer with a catalyst system in the form of a manganese complex, a manganese carboxylate complex and/or a manganese acetate complex or a mixture thereof.

27. The coating according to claim 1 or 2, wherein the catalyst system is present in 0.5 to 3 parts in dry weight of the total dry coat weight.

28. A paper coated with a coating according to claim 1 or 2 as top coat.

29. The paper according to claim 28, wherein beneath said top coat there is an additional coating, provided with the catalyst system.

30. A method for the production of a coating according to claim 1 or 2, wherein the transition metal complex is present in the catalyst system as a water solution or dispersion and is added to a stirred coating formulation, and the final coating formulation is coated onto a paper substrate.

31. The method according to claim 30, wherein concomitantly with the addition of the transition metal complex/salt a chelating agent and/or ligand, is added to the coating formulation, wherein the chelating agent and/or ligand is added as a water solution or dispersion and contains an agent to increase the solubility/dispersibility of the chelating agent.

* * * * *